US012525096B2

(12) United States Patent
Delekta et al.

(10) Patent No.: US 12,525,096 B2
(45) Date of Patent: Jan. 13, 2026

(54) GAMING OPERATION FOR DYNAMICALLY AND RANDOMLY MODIFYING SYMBOL AWARDS DISPLAYED ON A GAMING DEVICE

(71) Applicant: Aristocrat Technologies, Inc., Las Vegas, NV (US)

(72) Inventors: Scott Delekta, Las Vegas, NV (US); Allon Englman, Las Vegas, NV (US)

(73) Assignee: ARISTOCRAT TECHNOLOGIES, INC., Las Vegas, NV (US)

( * ) Notice: Subject to any disclaimer, the term of this patent is extended or adjusted under 35 U.S.C. 154(b) by 303 days.

(21) Appl. No.: 18/465,004

(22) Filed: Sep. 11, 2023

(65) Prior Publication Data

US 2025/0087059 A1 Mar. 13, 2025

(51) Int. Cl.
*G07F 17/32* (2006.01)

(52) U.S. Cl.
CPC ...... *G07F 17/3267* (2013.01); *G07F 17/3213* (2013.01); *G07F 17/3258* (2013.01)

(58) Field of Classification Search
CPC .. G07F 17/32; G07F 17/3211; G07F 17/3213; G07F 17/3244; G07F 17/326; G07F 17/3262; G07F 17/3267; G07F 17/34
See application file for complete search history.

(56) References Cited

U.S. PATENT DOCUMENTS

| | | | | |
|---|---|---|---|---|
| 7,771,266 B2 * | 8/2010 | Gerrard | G07F 17/32 463/20 |
| 9,087,434 B2 * | 7/2015 | Schwerdling | G07F 17/3267 |
| 10,810,827 B2 * | 10/2020 | Grace | G07F 17/3267 |
| 12,249,206 B2 * | 3/2025 | Meyer | G07F 17/34 |
| 2002/0198039 A1 * | 12/2002 | Marks | G07F 17/34 463/20 |
| 2003/0064772 A1 * | 4/2003 | Tempest | G07F 17/32 463/16 |
| 2004/0048646 A1 | 3/2004 | Visocnik | |
| 2004/0063488 A1 | 4/2004 | Berman | |
| 2004/0242319 A1 | 12/2004 | Walker | |

(Continued)

OTHER PUBLICATIONS

Notice of Allowance dated Oct. 13, 2022 for U.S. Appl. No. 17/449,588 (pp. 1-22).

(Continued)

*Primary Examiner* — Milap Shah
(74) *Attorney, Agent, or Firm* — Armstrong Teasdale LLP

(57) ABSTRACT

An electronic gaming device is disclosed to (i) cause display of a game play matrix including a plurality of symbol positions including a set of active symbol positions and a set of locked symbol positions and arranged in columns and rows in response to triggering a bonus game; (ii) cause display of a modifier row proximate to the game play matrix where the modifier row; (iii) randomly determine a first set of symbols for displaying on the modifier row; (iv) randomly determine a second set of symbols for displaying within the active symbol positions of the game play matrix; and (v) cause modification of at least one modifiable symbol of the second set of symbols by showing a respective value assigned to a value symbol of the first set of symbols being transferred to the at least one modifiable symbol displayed within the game play matrix.

20 Claims, 15 Drawing Sheets

(56) References Cited

U.S. PATENT DOCUMENTS

| | | | | |
|---|---|---|---|---|
| 2007/0218983 | A1 | 9/2007 | Lombardo | |
| 2008/0108431 | A1 | 5/2008 | Cuddy | |
| 2008/0287178 | A1 * | 11/2008 | Berman | G07F 17/3211<br>463/20 |
| 2009/0075722 | A1 * | 3/2009 | Louie | G07F 17/32<br>463/20 |
| 2010/0029381 | A1 | 2/2010 | Vancura | |
| 2014/0274285 | A1 | 9/2014 | Meyer | |
| 2014/0274294 | A1 | 9/2014 | Baerlocher | |
| 2015/0105138 | A1 | 4/2015 | Delekta | |
| 2016/0093172 | A1 | 3/2016 | Kitamura | |
| 2017/0053496 | A1 | 2/2017 | Borissov | |
| 2018/0130308 | A1 | 5/2018 | Berman | |
| 2019/0051096 | A1 | 2/2019 | San | |
| 2019/0096167 | A1 * | 3/2019 | Tam | G07F 17/3213 |
| 2019/0295377 | A1 | 9/2019 | Suda | |
| 2020/0005600 | A1 | 1/2020 | Marks | |
| 2020/0105090 | A1 | 4/2020 | Caputo | |
| 2021/0217276 | A1 | 7/2021 | Sidoti | |
| 2021/0366237 | A1 | 11/2021 | Bouvier | |
| 2023/0049641 | A1 * | 2/2023 | Meyer | G07F 17/3267 |
| 2023/0177911 | A1 * | 6/2023 | Milosevich | G07F 17/326<br>463/31 |
| 2024/0304063 | A1 * | 9/2024 | Robards | G07F 17/3267 |
| 2025/0118162 | A1 * | 4/2025 | Tucker | G07F 17/3267 |

OTHER PUBLICATIONS

Office Action dated Sep. 22, 2022 for U.S. Appl. No. 17/449,622 (pp. 1-21).

Office Action dated Oct. 6, 2022 for U.S. Appl. No. 17/449,593 (pp. 1-13).

Notice of Allowance dated Dec. 29, 2022 for U.S. Appl. No. 17/449,588 (pp. 1-22).

Office Action (Non-Final Rejection) dated Feb. 13, 2024 for U.S. Appl. No. 18/183,048 (pp. 1-17).

Office Action (Non-Final Rejection) dated Jul. 2, 2024 for U.S. Appl. No. 18/354,531 (pp. 1-36).

Office Action (Final Rejection) dated Jun. 5, 2024 for U.S. Appl. No. 18/183,048 (pp. 1-12).

* cited by examiner

GAMING OPERATION FOR DYNAMICALLY AND RANDOMLY MODIFYING SYMBOL AWARDS DISPLAYED ON A GAMING DEVICE

TECHNICAL FIELD

The field of disclosure relates generally to electronic gaming machines, and more specifically, to systems and methods of decoupling an award value and/or an award type from a game symbol generation process in a gaming environment.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency, or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is disclosed. The electronic gaming device may include a memory device storing instructions, and a game controller including a processor configured to execute the instructions stored in the memory device, which when executed, may cause the game controller to (i) cause display of a game play matrix including a plurality of symbol positions arranged in columns and rows in response to triggering a bonus game where the plurality of symbol positions may include a set of active symbol positions and a set of locked symbol positions; (ii) cause display of a modifier row proximate to the game play matrix where the modifier row may include a plurality of symbol positions, and each symbol position of the modifier row may be associated with a column of the game play matrix; (iii) randomly determine, using an output from a random number generator (RNG), a first set of symbols for displaying on the modifier row, where the first set of symbols may include a value symbol displayed in a first symbol position of the modifier row associated with a first column of the game play matrix; (iv) randomly determine, using an output from the RNG, a second set of symbols for displaying within the active symbol positions of the game play matrix, where the second set of symbols may include at least one modifiable symbol displayed within the first column of the game play matrix; and/or (v) cause modification of the at least one modifiable symbol by showing a respective value assigned to the value symbol displayed in the first symbol position of the modifier row associated with the first column of the game play matrix being transferred to the at least one modifiable symbol displayed within the game play matrix.

In another aspect, a computer-implemented method is disclosed. The method may include, in response to triggering a bonus game, causing display of a game play matrix including a plurality of symbol positions arranged in columns and rows. The plurality of symbol positions may include a set of active symbol positions and a set of locked symbol positions. The method may include causing display of a modifier row proximate to the game play matrix. The modifier row may include a plurality of symbol positions, and each symbol position of the modifier row may be associated with a column of the game play matrix. The method may include randomly determining, using an output from a random number generator (RNG), a first set of symbols for displaying on the modifier row, the first set of symbols including a value symbol displayed in a first symbol position of the modifier row associated with a first column of the game play matrix, and randomly determining, using an output from the RNG, a second set of symbols for displaying within the active symbol positions of the game play matrix. The second set of symbols may include at least one modifiable symbol displayed within the first column of the game play matrix. The method may include causing modification of the at least one modifiable symbol by showing a respective value assigned to the value symbol displayed in the first symbol position of the modifier row associated with the first column of the game play matrix being transferred to the at least one modifiable symbol displayed within the game play matrix.

In yet another aspect, an electronic gaming application server communicatively coupled with an electronic gaming device is disclosed. The electronic gaming application server may include a memory device storing instructions, at least one random number generator (RNG), and a game controller comprising a processor configured to execute the instructions stored in the memory device, which, when executed, cause the game controller to: (i) cause display of a game play matrix including a plurality of symbol positions arranged in columns and rows in response to triggering a bonus game where the plurality of symbol positions may include a set of active symbol positions and a set of locked symbol positions; (ii) cause display of a modifier row proximate to the game play matrix where the modifier row may include a plurality of symbol positions, and each symbol position of the modifier row may be associated with a column of the game play matrix; (iii) randomly determine, using an output from a random number generator (RNG), a first set of symbols for displaying on the modifier row, where the first set of symbols may include a value symbol displayed in a first symbol position of the modifier row associated with a first column of the game play matrix; (iv) randomly determine, using an output from the RNG, a second set of symbols for displaying within the active symbol positions of the game play matrix, where the second set of symbols may include at least one modifiable symbol displayed within the first column of the game play matrix; and/or (v) cause modification of the at least one modifiable symbol by showing a respective value assigned to the value symbol displayed in the first symbol position of the modifier row associated with the first column of the game play matrix being transferred to the at least one modifiable symbol displayed within the game play matrix.

DETAILED DESCRIPTION

Figure 1:
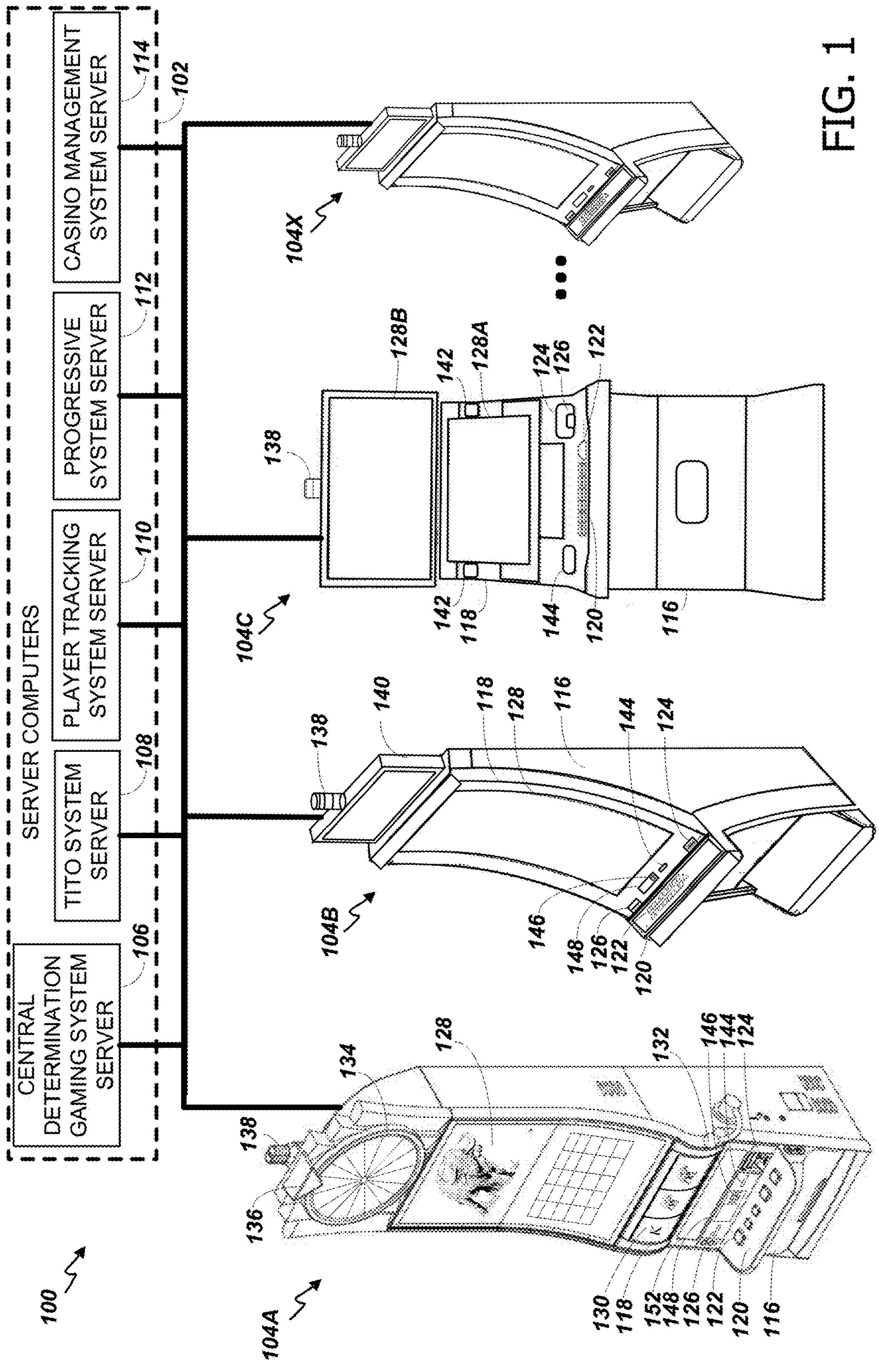
FIG. 1 is an exemplary diagram showing several EGMs networked with various gaming related servers.

In electronic gaming machines (EGMs), a credit value (or an award value) to a game player may be determined, in part, based upon credit symbols that land on or displayed on reels in a game play matrix area when the reels stop spinning during a base game play and/or a bonus game (or a feature game). Generally, some game symbols are randomly (based on an output of a random number generator (RNG)) assigned a prize value and revealed as part of the game outcome. In some cases, the credit symbols that land in the game play matrix are awarded to the player, for example, in a hold and spin mechanic. One of the challenges that arises in game design is the desire to display higher value prizes during game play while also controlling game volatility. In other words, presenting or landing higher prize values during a game may result in the player receiving those higher prize values for a given game mechanic, which may in turn impact the overall volatility of the game and the ability to achieve a certain return to player (RTP). As a result, to achieve a designated game volatility and/or RTP, the game may be configured to present higher prize value to players at a relatively lower rate and lower prize values at a relatively higher rate. This is not a desired result. In addition, EGMs that store multiple symbols having different values assigned to them for display purposes can require large amounts of memory and computation processing resources. It is desirous to have an EGM that is better able to control volatility while still frequently presenting large value awards and to do so using a machine that uses less memory and processing resources.

The EGM described herein is configured to achieve a designated game volatility with an improved gaming device operation by decoupling an award value (or a prize value) and/or an award type (or a prize type) from the game symbol generation process. By way of a non-limiting example, the systems and processes described herein include decoupling the game symbol generation process by using a modifier reel that is used to assign values and/or award types to certain symbols that are displayed within a game play area. In some examples, the modifier reel may be a horizontal reel in the game play matrix area or adjacent to the game play matrix area. Alternatively, the modifier reel may be a vertical reel in the game play matrix area or adjacent to the game play matrix area. In order to ensure a game feature volatility meets a specific target threshold, award values and/or award types that land on the modifier reel may be linked with a set of reels associated with a particular game feature. Accordingly, during a game play, high prize (or award) values, feature enhancements, and/or feature triggers may be displayed without impacting the game feature's volatility since the modifier reel includes prize values regardless of whether an activation symbol (or a trigger symbol or a credit symbol) actually lands in a game symbol position in a column of the game play matrix. The prize values revealed in the modifier reel (in a particular column) may only trigger a payout if the activation symbol (or the trigger symbol or the credit symbol) also lands in a game symbol position in the particular column.

In some embodiments of the present gaming device, a designated game volatility may be more efficiently achieved while complying with gaming regulations by randomly generating (based on an RNG output) each value for a game symbol position of the modifier reel and linking the values to a different set of reel strips. Additionally, or alternatively, the prize values for the modifier reel may be linked or associated with the one or more sets of reel strips in accordance with a randomly determined volatility state and/or a game state parameter. In other words, the randomly determined volatility state and/or the game state parameter may be relied upon to (i) generate the prize values for the modifier reel; (ii) determine which set of reel strips to use during one or more spins of a game play; and/or (iii) a game feature to be added to the modifier reel. In one example, if the modifier reel is randomly set to generate relatively high prize values (or award values), the game may utilize a set of reel strips that generate less symbols to better control the likelihood of triggering a payout, allowing for game enhancements to activate, and/or triggering a game feature.

In some embodiments, when a specific condition is met during the base game play, the feature game or the bonus game including a hold and spin feature may be triggered. By way of a non-limiting example, the hold and spin feature during the feature game or the bonus game may be enabled in a plurality of different ways. In one example, a particular way, in which the hold and spin feature is enabled during the bonus game or the feature game, may be determined based on one or more scatter symbols (money bags) being randomly selected for the bonus game or the feature game. By way of a non-limiting example, if three scatter symbols bag-1, bag-2, and bag-3 are displayed during the bonus game or feature game play, each of the bag-1, bag-2, and bag-3 may be associated with a respective hold and spin feature. For example, bag-1 may be associated with an extra spins feature, bag-2 may be associated with an extra rows feature, and/or bag-3 may be associated with an extra cash feature. Each of the scatter symbols, e.g., bag-1, bag-2, and/or bag-3, may be visually distinguishable from each other. For example, bag-1 may be displayed in a red color, and bag-2 and bag-3 may be displayed in a green color and a blue color, respectively. Accordingly, if more than one bag is selected during the bonus game or the feature, a hold and spin feature corresponding to each selected bag may be enabled during the bonus game or the feature game. The following table describes which hold and spin feature(s) may be enabled during the bonus game or the feature game.

TABLE 1

| Bag (or Bag Color) Selected for Bonus Game or Feature Game | Hold and Spin feature(s) Enabled during the Bonus Game or Feature Game |
|---|---|
| Bag-1 (Red) | Hold and Spin + extra spins |
| Bag-2 (Green) | Hold and Spin + extra rows |
| Bag-3 (Blue) | Hold and Spin + extra cash |
| Bag-1 (Red), and Bag-2 (Green) | Hold and Spin + extra spins + extra rows |
| Bag-1 (Red), and Bag-3 (Blue) | Hold and Spin + extra spins + extra cash |
| Bag-2 (Green), and Bag-3 (Blue) | Hold and Spin + extra rows + extra cash |
| Bag-1 (Red), Bag-2 (Green), and Bag-3 (Blue) | Hold and Spin + extra spins + extra rows + extra cash |

In some embodiments, the game play matrix area may be updated for the bonus game or the feature game. By way of a non-limiting example, the game play matrix area during the bonus game or feature game may be of 5×8 game matrix, which includes reels having 5 columns and 8 rows. Additionally, or alternatively, the bonus game or feature game may also include (i) one or more meters corresponding to Major Jackpot, Mini Jackpot, Minor Jackpot, and/or Grand Jackpot; (ii) a number of remaining spins; and/or (iii) one or more scatter symbols (bags) selectable for triggering the bonus game or the feature game, which are displayed on the display of the EGM. The player may be notified about the in-progress bonus game or the feature game by displaying a message, such as "BONUS REELS IN PLAY," along with a message, such as "PRESS PLAY TO SPIN," requesting the player to begin the bonus game or the feature game.

By way of a non-limiting example, 1 of the 8 rows, for example, the bottom row, may be designated as a row for showing the modifier reel (referenced herein as a modifier row). In the example embodiment, the next 3 rows above the modifier row may be the initially active rows or base game rows. The next 3 rows above the initially active rows may be locked or inactive rows, which may be unlocked in accordance with the extra rows hold and spin feature being enabled. The top row may be associated with the extra cash hold and spin feature and may also be a locked row. However, the top row associated with the extra cash hold and spin feature may be unlocked when the extra cash hold and spin feature is enabled.

In response to receiving an input from the player to begin the bonus game or the feature game, one or more hold and spin features described herein may be randomly selected based upon an RNG output. A game state, which is associated with the one or more triggered hold and spin features, may be updated, and an animation suggesting the one or more triggered hold and spin features may be triggered.

In the example embodiment, when the game play matrix area is a 5×8 matrix during the bonus game or feature game, the modifier row may include 5 game symbol positions, which may be populated randomly based upon an RNG output. By way of a non-limiting example, the game symbols that populate the modifier row may be one or more of a credit symbol, a first feature symbol (e.g., a dynamite symbol), and/or a second feature symbol (e.g., a Louie symbol). The dynamite symbol and/or the Louie symbol are for example only, and the dynamite symbol may be replaced with any other object symbol, while the Louie symbol may be replaced with any other character symbol.

In some embodiments, the player may be awarded a certain number of spins at the beginning of the bonus game or the feature game. For example, if an extra spins hold-and-spin feature is enabled during the bonus game or the feature game, the player may be awarded 4 free spins, otherwise the player may be awarded a standard 3 free spins. Before beginning a spin of the awarded certain number of spins, game symbol positions in the modifier row may be populated with one or more of the credit symbols, the dynamite symbols, and/or the Louie symbols. Subsequent to, or simultaneously with the populating of the game symbol positions in the modifier row, each game symbol position within the active game symbol positions may be spun resulting in either a blank symbol or a coin symbol being displayed in each of the active symbol positions. In some examples, another symbol may be used in place of the coin symbol.

If a coin symbol is displayed (or the other symbol used in place of the coin symbol) in the first column of the active game symbol positions, the credit value displayed in the game symbol position in the first column of the modifier row is overlayed or animated onto the one or more coin symbols displayed in that first column. Additionally, or alternatively, the number of remaining spins may be reset to the maximum number of available spins (e.g., 3 spins or 4 spins), as described herein, if the coin symbol, or the other symbol used in place of the coin symbol, is spun and displayed within one of the active game symbol positions. Further, the active game symbol position may then be locked for the remainder of the bonus game with the value displayed thereon. In other words, that game symbol position is not spun during the remaining available spins. The bonus game or the feature game may be concluded or terminated when the number of remaining spins reaches zero or all of the active symbol positions are filled credit value symbols. Additionally, or alternatively, the game may then transition back to the base game. All the prizes or awards then may be added together and displayed in a main win meter. Prizes associated with the Grand Jackpot, or the Major Jackpot may be awarded as soon as they are won by the player.

As described above, the EGM system described herein is configured to better provide a game feature volatility that meets a specific target threshold by including a modifier reel that links award values and/or award types that land on the modifier reel to a set of reels that are each associated with a particular game feature. The particular game feature may include one of (i) a hold and spin plus extra spins feature; (ii) a hold and spin plus extra rows feature; (iii) a hold and spin plus extra cash feature; (iv) a hold and spin plus extra rows plus extra spins feature; (v) a hold and spin plus extra rows plus extra cash feature; (vi) a hold and spin plus extra cash plus extra spins feature; and/or (vii) a hold and spin plus extra rows plus extra cash plus extra spins feature.

In some embodiments, and by way of a non-limiting example, the game feature volatility described herein may be at least two values (e.g., a high volatility and a low volatility) and may be selected from a lookup table that corresponds with the particular game feature. An exemplary lookup table corresponding to the hold and spin plus extra spins feature may be as shown below, where N1 and N2 may be positive integer values. By way of a non-limiting example, a value for N1 may be higher than a value for N2 such that the low feature volatility may have a higher likelihood of being selected over the high feature volatility.

```
<weighttable name="Feature_Volatility_Extra_Spins" type="string">
<weightentry count="N1" value="LOW"/>
<weightentry count="N2" value="HIGH"/>
</weighttable>
```

The game feature volatility may be determined once, for example, at the beginning of the feature game or the bonus game. In other words, the game feature volatility may be determined once before the first spin of the bonus game or the feature. Alternatively, the game feature volatility may be determined before each spin during the bonus game or the feature game. Corresponding to each game feature volatility, a plurality of reel sets (e.g., 3-reel sets including a reel set A, a reel set B, and a reel set C) may be used for the bonus game or the feature. Reel strips for each reel set (e.g., the reel set A, the reel set B, and/or the reel set C) may include the blank symbol and/or the coin symbol, according to a respective lookup table. In one example, reel strips for the game play matrix area of a 5×8 matrix may be according to reel sets as shown below.

| Row Number | Column 1 | Column 2 | Column 3 | Column 4 | Column 5 |
|---|---|---|---|---|---|
| 8 | Big Prize | Big Prize | GRAND Prize | Big Prize | Big Prize |
| 7 | Reel B | Reel B | Reel B | Reel B | Reel B |
| 6 | Reel B | Reel B | Reel B | Reel B | Reel B |
| 5 | Reel A | Reel A | Reel A | Reel A | Reel A |
| 4 | Reel A | Reel A | Reel A | Reel A | Reel A |
| 3 | Reel A | Reel A | Reel A | Reel A | Reel A |
| 2 | Reel C | Reel C | Reel A | Reel A | Reel A |
| 1 | Modifier Symbol | Modifier Symbol | Modifier Symbol | Modifier Symbol | Modifier Symbol |

As described herein, the modifier symbols corresponding to each of columns 1 through 5 and shown in row 1 may be randomly selected before beginning a spin during the bonus or feature game, and game reels corresponding to each of columns 1 through 5 and shown on active rows (e.g., rows 2 through 4 when the extra rows feature is not enabled, or rows 2 through 4 and one or more of rows 5 through 7 if the extra rows feature is enabled). Additionally, or alternatively, game symbols corresponding to row 8 (and associated with the extra cash feature) and each of column 1 through column 5 may be determined in accordance with the feature game volatility determined using a lookup table, as described herein, for each of column 1 through column 5.

In some embodiments, if the extra cash hold and spin feature is enabled the first spin during the bonus or feature game may be an extra cash spin, and for each subsequent spins during the bonus game or the feature game, whether that spin would be an extra cash spin may be redetermined. In one example, corresponding to the game feature volatility (e.g., low volatility or high volatility), a lookup table, as shown below, may be referenced for determining whether the spin would be the extra cash hold and spin feature.

```
<weighttable name="Extra Cash Spin Check - Low" type="bool">
  <weightentry count="N3" value="true"/>
  <weightentry count="N4" value="false"/>
</weighttable>
```

In the exemplary lookup table above, N3 and N4 are positive integer values, where N3 may be less than N4 such that the extra cash hold and spin feature may be selected less frequently.

In some embodiments, a modifier symbol corresponding to each of the column 1 through column 5 and shown in row 1 may be determined based on the game feature volatility (e.g., low volatility or high volatility) and based on a game state identifier (or id). By way of a non-limiting example, the following lookup table uses the game state id because the game state id 1 may be used until at least one credit symbol lands as a modifier symbol. A value of N5 may be a positive integer, e.g., 1.

```
<weighttable name="Modifier Row-LOW-1" type="string">
  <weightentry count="N5" value="CREDIT"/>
</weighttable>
```

The credit symbol value may be determined in accordance with a lookup table, for example, a lookup table shown below.

```
<weighttable name="Modifier Row Credit Prize LOW" type="int">
  <weightentry count="N6" value="$value1"/>
  <weightentry count="N7" value="$value2"/>
  <weightentry count="N8" value="$value3"/>
  ...
</weighttable>
```

In the lookup table above, only few weighted entries (3 weighted entries) corresponding to three different credit values (e.g., $value1, $value2, and/or $value3) are shown. However, the lookup table may include any number weighted entries corresponding to any credit values. By way of a non-limiting example, weights N6, N7, and N8 may be integer values such that a value of a weight corresponding to a higher credit value may be a lower value.

In some embodiments, if a spin during the bonus game or the feature is an extra cash hold and spin feature spin, a lookup table, which is shown below as an example, may be used. Additionally, or alternatively, the credit values may be multiplied by a bet multiplier of the current game instance.

```
<weighttable name="Modifier Row Credit Prize LOW" type="int">
  <weightentry count="N9" value="$value4"/>
  <weightentry count="N10" value="$value5"/>
  <weightentry count="N11" value="$value6"/>
  ...
</weighttable>
```

In the lookup table above, only few weighted entries (3 weighted entries) corresponding to three different credit values (e.g., $value4, $value5, and/or $value6) are shown. However, the lookup table may include any number weighted entries corresponding to any credit values. By way of a non-limiting example, weights N9, N10, and N11 may be integer values such that a value of a weight corresponding to a higher credit value may be a lower value.

Upon at least one credit symbol landing as a modifier symbol, a lookup table corresponding to a game state id as game state id 2, and shown below for an example, may be used. In the lookup table below, N6, N7, and N8 may be positive integer values.

```
<weighttable name="Modifier Row-LOW-2" type="string">
  <weightentry count="N12" value="CREDIT"/>
  <weightentry count="N13" value="LOUIE"/>
  <weightentry count="N14" value="DYNAMITE"/>
</weighttable>
```

The modifier symbol Louie character may, for example, award either a credit prize or a Jackpot prize. Whether to award the credit prize or the Jackpot prize may be determined using a following exemplary lookup table.

```
<weighttable name="Louie Prize Type-LOW" type="string">
  <weightentry count="N15" value="Credit"/>
  <weightentry count="N16" value="Jackpot"/>
</weighttable>
```

If a Louie prize selected from the lookup table is a credit prize, a value of the credit prize may be selected using another lookup table. If a Louie prize selected from the lookup table is a Jackpot prize, a Jackpot prize may be determined using a lookup table, for example, using a lookup table as shown below. In the lookup table below, # corresponds with a bet denominator, and @ corresponds with a bet in credits. N17, N18, N19, and N20 each may be a positive integer value.

```
<weighttable name="Louie_Jackpot_Prize_#_@" type="string">
  <weightentry count="N17" value="Grand"/>
  <weightentry count="N18" value="Major"/>
  <weightentry count="N19" value="Minor"/>
  <weightentry count="N20" value="Mini"/>
</weighttable>
```

In some embodiments, if a Louie character symbol lands on a column as a modifier symbol, and a coin symbol is spun for a game symbol position for the column in which the Louie character is displayed, the player may be awarded one of the Jackpot prizes, described above, or a random credit prize. Additionally, when the player is awarded one of the Jackpot prizes, or the random credit prize, an animation showing the Louie character and a special headshake may be displayed. If the player is awarded a grand Jackpot or a major Jackpot, an animation showing coin shower and/or a celebratory banner may be displayed. The particular game symbol position may be locked during the remaining spins.

Prizes selected for the modifier symbols may be displayed according to their values in an ascending order. Alternatively, the selected prizes may be displayed in a descending order. Additionally, or alternatively, while displaying the prizes, more anticipation or excitement may be caused by using randomly selected step values for displaying the selected prizes. The step values may be selected based on an exemplary lookup table shown below.

```
<weighttable name="Louie Prize Steps" type="int">
  <weightentry count="N21" value="Integer1"/>
  <weightentry count="N22" value="Integer2"/>
  <weightentry count="N23" value="Integer3"/>
  ...
</weighttable>
```

In the lookup table above, only few weighted entries (3 weighted entries) corresponding to three different integer step values (e.g., Integer1, Integer2, and/or Integer3) are shown. However, the lookup table may include any number weighted entries corresponding to any integer values. By way of a non-limiting example, weights N21, N22, and N23 may be integer values.

In some embodiments, if the modifier symbol selected is a dynamite symbol, and a coin symbol is spun into a game symbol position in the same column for which the dynamite modifier symbol is displayed, the particular game symbol position (where the coin symbol is displayed) will not be locked out and no credit prize will be awarded. However, a locked game symbol position in the same column will be unlocked and activated for future spins. If all game symbol positions in the column in which the dynamite modifier symbol is displayed are already active, a top-level prize, for example, a prize shown in the top-most row may be awarded to the player. By way of a non-limiting example, the prize awarded to the player may be, as described herein, the big prize and/or the grand prize, and may be awarded more than one time. When the prize is awarded to the player, an animation showing a burst, or a sparkle may also be displayed.

As described herein, in some embodiments, modifier symbols may be reselected before each spin during the bonus game or the feature game. Further, as described herein, a coin symbol spun in a game symbol position may cause the respective game symbol position being locked for the subsequent spins. If all game symbol position (except in the top and the bottom rows) in a column include either coin symbols or locked positions, the column may be considered as a disabled column. If a dynamite modifier symbol is selected for the modifier symbol for the disabled column, the dynamite modifier symbol may be displayed, for example, as a golden dynamite. Additionally, a locked game symbol position in the same column may be unlocked. If all game symbol positions in the column in which the golden dynamite modifier symbol is displayed are occupied with an active symbol, a top-level prize, for example, a prize shown in the top-most row may be awarded to the player. By way of a non-limiting example, the prize awarded to the player may be, as described herein, the big prize and/or the grand prize, and may be awarded more than one time. When the prize is awarded to the player, an animation showing a burst, or a sparkle may also be displayed.

Accordingly, during a game play, high prize (or award) values, feature enhancements, and/or feature triggers may be enabled or displayed without impacting the game feature's volatility since the modifier reel includes prize values regardless of whether an activation symbol (or a trigger symbol or a credit symbol) lands in a game symbol position in a column of the game play matrix. The prize values revealed in the modifier reel (in a particular column or a particular row) may only trigger payout if the activation symbol (or the trigger symbol or the credit symbol) lands in a game symbol position in the particular column. Various exemplary embodiments described herein are discussed below in more detail with respect to FIGS. 1, 2A-2C, 3, 4A-4I, and 5.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Realm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
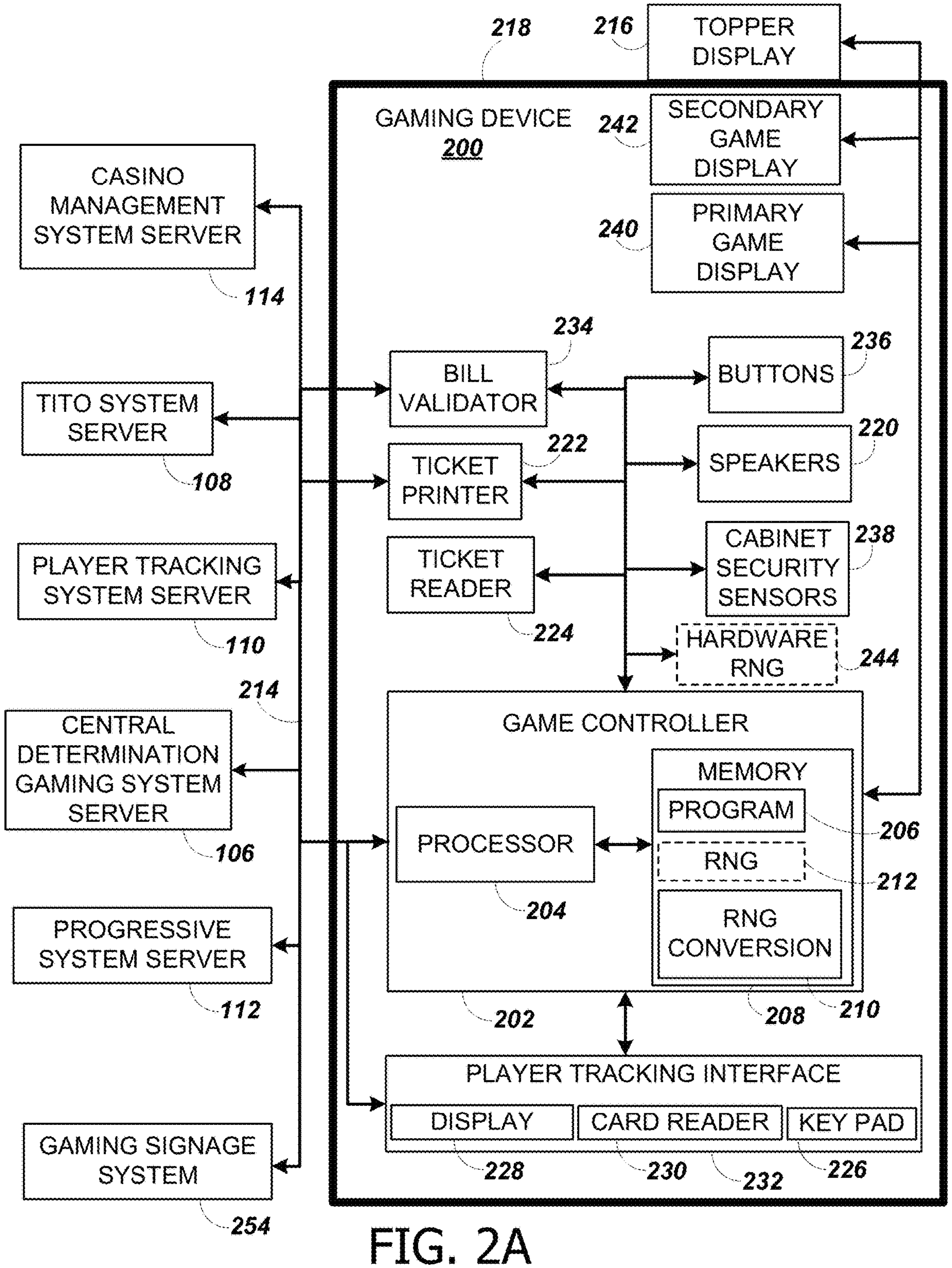
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play, or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random-access memory (SRAM), dynamic random-access memory (DRAM), magnetic random-access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A. RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. In general, volatility refers to the frequency or probability of an event such as a special mode, a payout, etc. For example, for a target level of RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
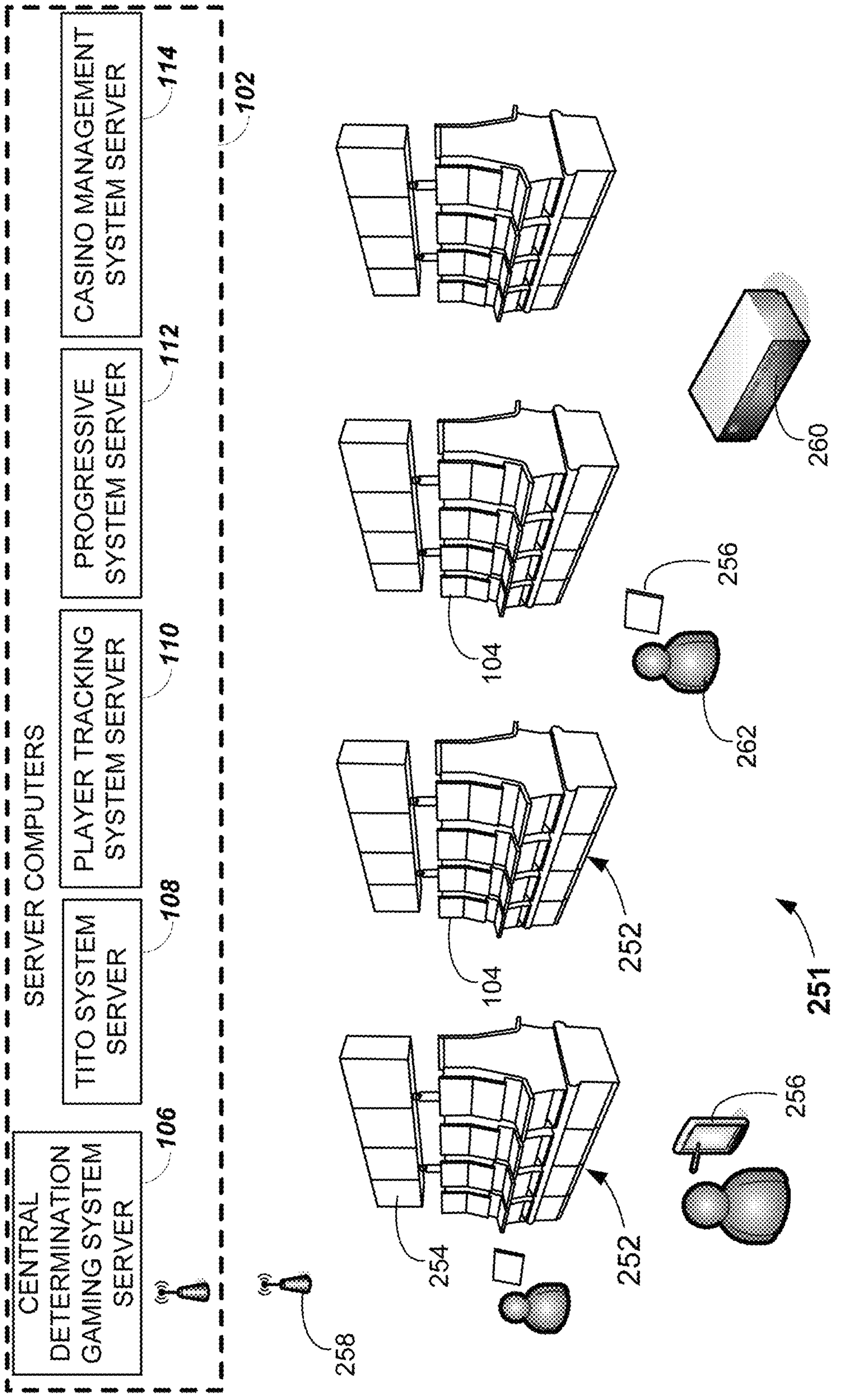
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
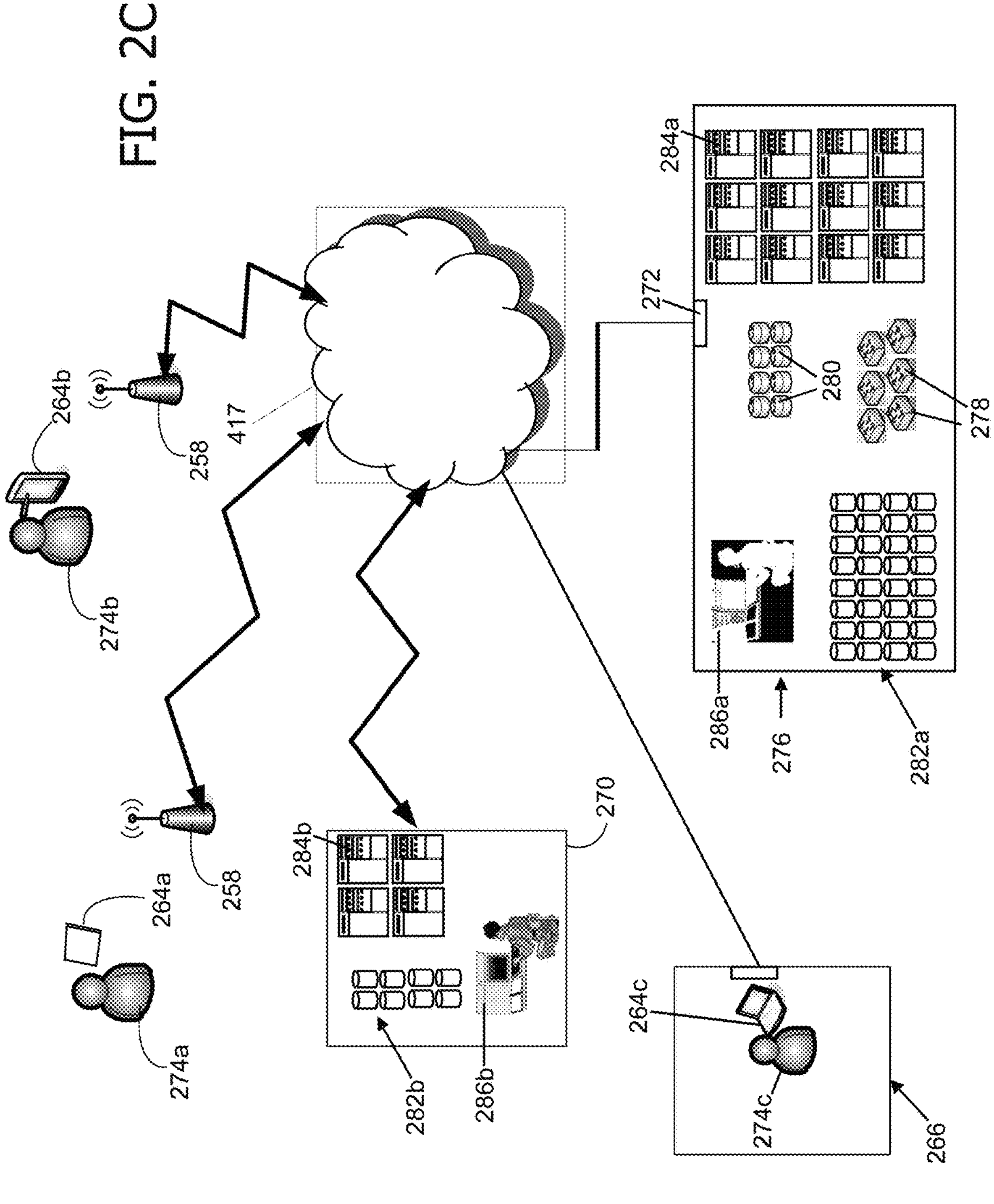
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types, and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
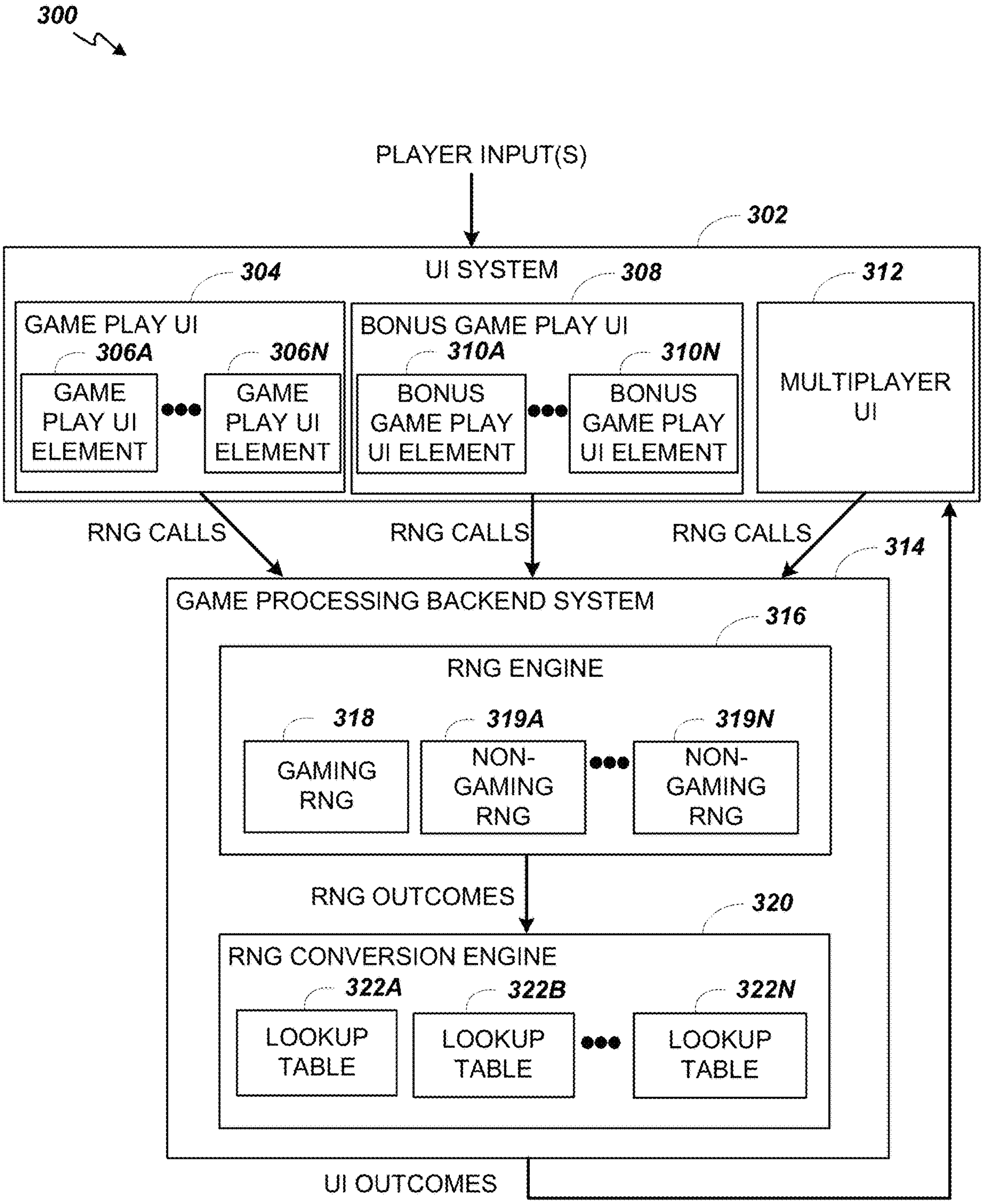
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with a UI system 302 receiving one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system

314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, or additionally, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

In some embodiments, based upon the UI outcome received by the UI system 302 during the base game, a bonus game, a hold and spin feature, and/or a free game may be triggered. During the bonus game or the feature game, prize values may be revealed in a modifier reel, and payout may be triggered if the activation symbol (or the trigger symbol or the credit symbol) lands in a game symbol position in particular column, as described herein, in more details with respect to FIGS. 4A-4I, and 5.

Figure 4A:
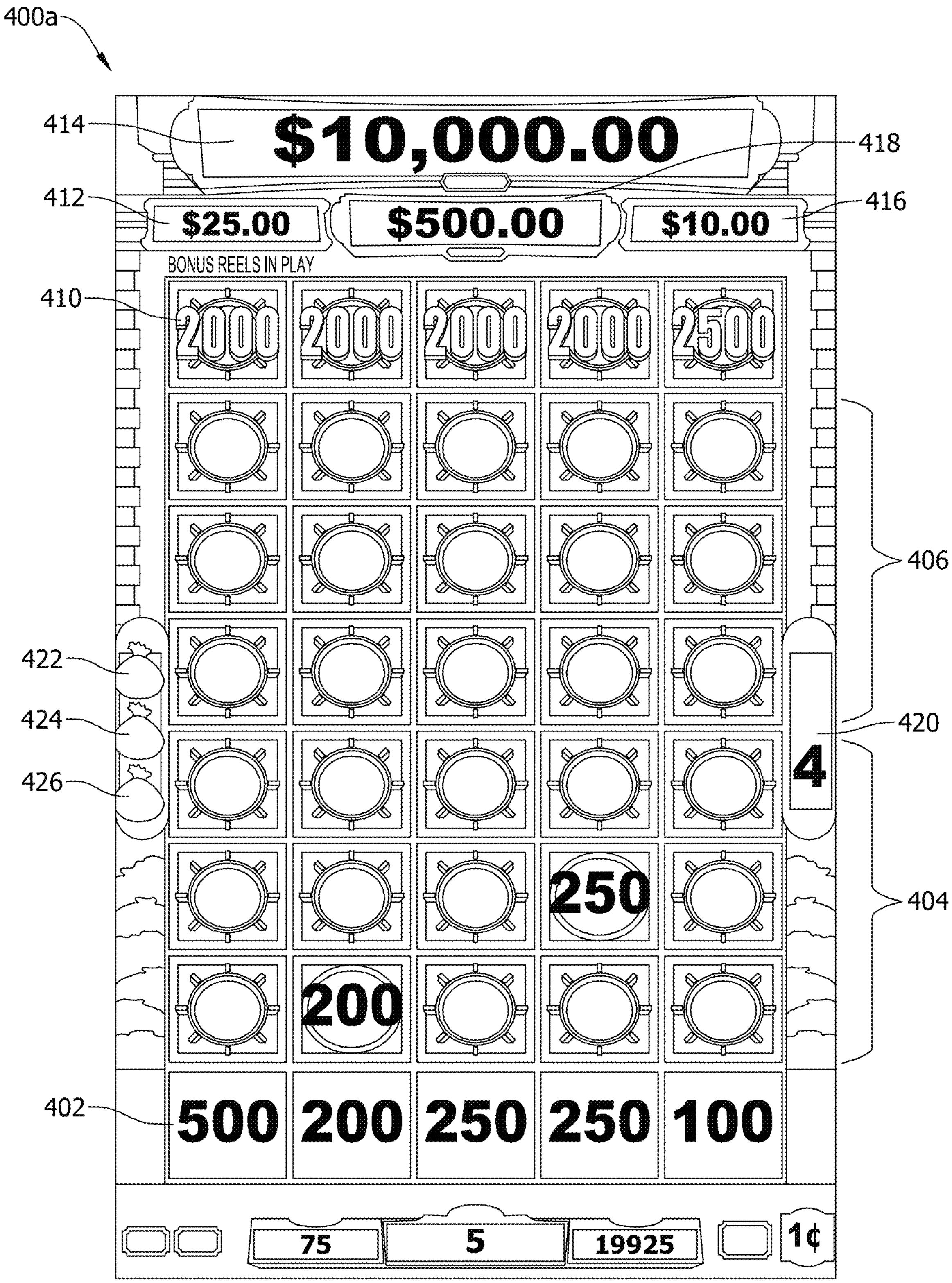
FIGS. 4A-4I are exemplary screenshots or user interfaces of an electronic gaming machine (EGM) programmed to dynamically and randomly modify symbol awards displayed thereon in accordance with some embodiments of the present disclosure.

FIGS. 4A-4I are exemplary screenshots or user interfaces of an electronic gaming machine (EGM) programmed to dynamically and randomly modify symbol awards displayed thereon in accordance with some embodiments of the present disclosure. In particular, FIGS. 4A-4I illustrate exemplary screenshots of a full or a partial view of an EGM, or an electronic gaming device, during a base game, a bonus game, or a feature game, and/or transition from the base game to the feature game or the bonus game. In an exemplary screenshot 400*a*, as shown in FIG. 4A, a game play matrix area displayed on a display device of an EGM may include a plurality of reels. For example, the game play matrix area shown in FIG. 4A may be a 5×8 matrix, during a feature or bonus game, that includes a plurality of reels arranged in 5 columns and 8 rows. The rows of the game play matrix area may be grouped in multiple subsets described below.

For example, a first subset of rows may include a modifier row identified in FIG. 4A as 402. A second subset of rows identified in FIG. 4A as 404 may be a subset of initially active rows, and a third subset of rows identified in FIG. 4A as 406 may be a subset of locked or inactive rows. One or more rows of the third subset of rows 406 may be unlocked and may become active rows upon certain conditions being met. A fourth subset of rows may include a single row identified in FIG. 4A as 410, which may be a prize row, and may be initially a locked row.

Additionally, or alternatively, Grand Jackpot 414, Major Jackpot 418, Minor Jackpot 412, and/or Mini Jackpot 416 may be displayed on the display device of the EGM. A number of available or remaining spins may be displayed, as shown in FIG. 4A as 420.

Figure 4B:
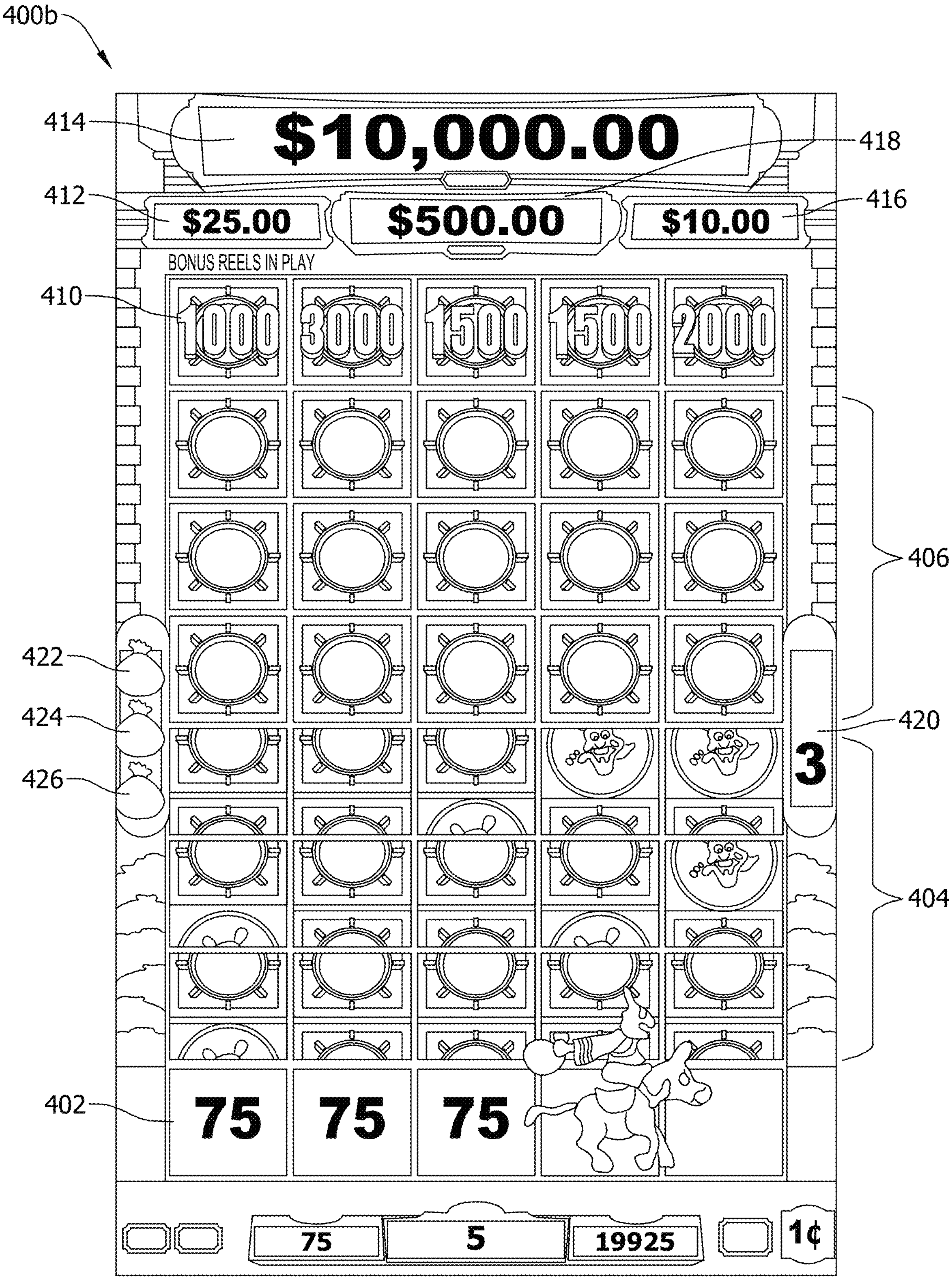

As described herein, the feature or bonus game may include a hold and spin feature, which may be enabled in a plurality of different ways. In one example, the hold and spin feature may be enabled during the bonus or feature game based on one or more scatter symbols (e.g., bags of money) being triggered, namely bag-1 422, a bag-2 426, and a bag-3 424, randomly being selected during the bonus game or the feature game. By way of a non-limiting example, bag-1 422 may be associated with an extra spins feature, bag-2 426 may be associated with an extra rows feature, and/or bag-3 424 may be associated with an extra cash feature. Each scatter bag 422, 424, and 426 may be visually distinguishable from each other. For example, bag-1 422 may be displayed in a red color, while bag-2 426 and bag-3 424 may be displayed in green color and blue color, respectively. If more than one scatter bag is selected during the bonus game or the feature, a hold and spin feature corresponding to each selected scattering bag may be enabled during the bonus game or the feature game, as described herein, in Table 1. In an exemplary screenshot 400*b*, as shown in FIG. 4B, when a particular condition is met during a base game play, a feature game or a bonus game may be triggered. Upon receiving an input (e.g., hitting a play button or a start button) from a player, the feature game or the bonus game may be initiated. Upon initiation of the bonus game or the feature game, the modifier row 402 may be populated with randomly selected game symbols including credit values, a Mini Jackpot symbol, a Minor Jackpot symbol, a Major Jackpot symbol, a Grand Jackpot symbol, and one or more feature symbols (e.g., a Louie character symbol, and/or a dynamite symbol). Since the modifier row 402 includes 5 game symbol positions, game symbols may be displayed as being populated from a game symbol position in the left most column (e.g., column 1) towards right columns (e.g., column 2 through column 5). By way of a non-limiting example, a feature symbol (e.g., a Louie character symbol) may be animated as marching through the game symbol positions as each game symbol position in the modifier row 402 is populated with the game symbols.

During the bonus game or the feature game, one or more game symbol positions in the subset of initially active rows 404 may be spun, for example, from left to right and/or from bottom to top. However, the one or more game symbol position in the subset of initially active rows 404 may be spun in any other pattern or order. A blank symbol or a coin symbol may be spun in an active game symbol position. The active game symbol position, as described herein, may be a game symbol position in which a coin symbol has not landed when reels stopped spinning.

Figure 4C:
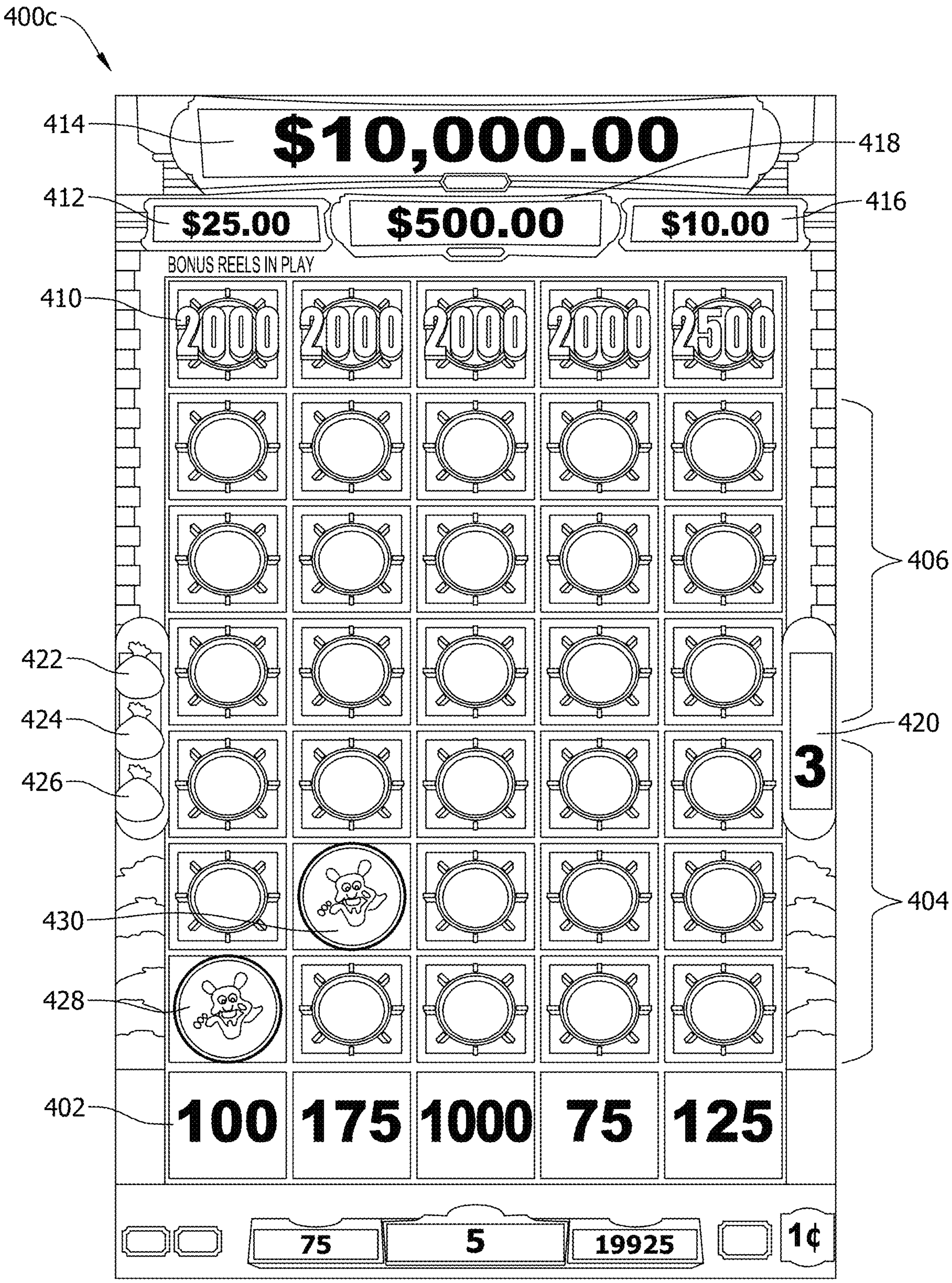
Figure 4D:
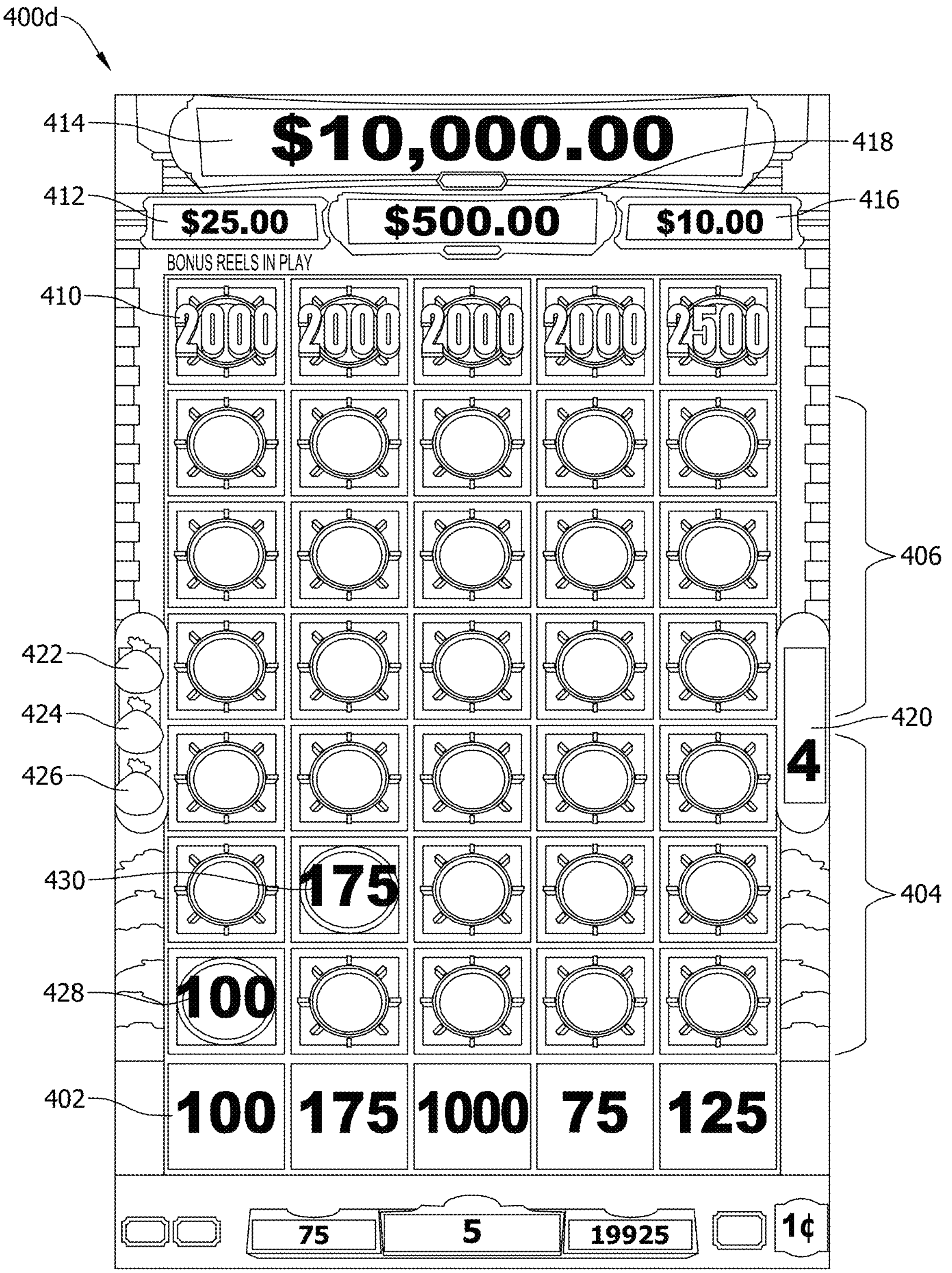

By way of a non-limiting example, as the spinning stops, as shown in an exemplary screenshot 400*c* in FIG. 4C, coin symbols 428 and 430 may land in game symbol positions in column 1 and column 2, respectively. By way of an example, the modifier row 402 may have credit symbols with values 100, 175, 1000, 75, and 125 in columns 1 through column 5, respectively, for the particular feature game or bonus game instance. Accordingly, as shown in an exemplary screenshot 400*d* in FIG. 4D, coin symbols 428 and 430 may be modified or overlayed to display credit values 100 and 175, respectively. Since each coin symbol that lands in a game symbol position when spinning stopped is assigned a credit value corresponding to a value displayed in a game symbol position in the same column in the modifier row 402, generation of an award value and/or an award type is decoupled from generation of game symbols.

Further, as described herein, if a coin symbol lands in a game symbol position, a number of remaining free spins or a number of available free spins may be reset to its original value such as 3 free spins or 4 free spins. As described herein, when the extra spins hold and spin feature is enabled based on the scatter symbol (e.g., bag-1 422) being selected for the hold and spin feature, the player may be given 4 free spins instead of 3 free spins.

Figure 4E:
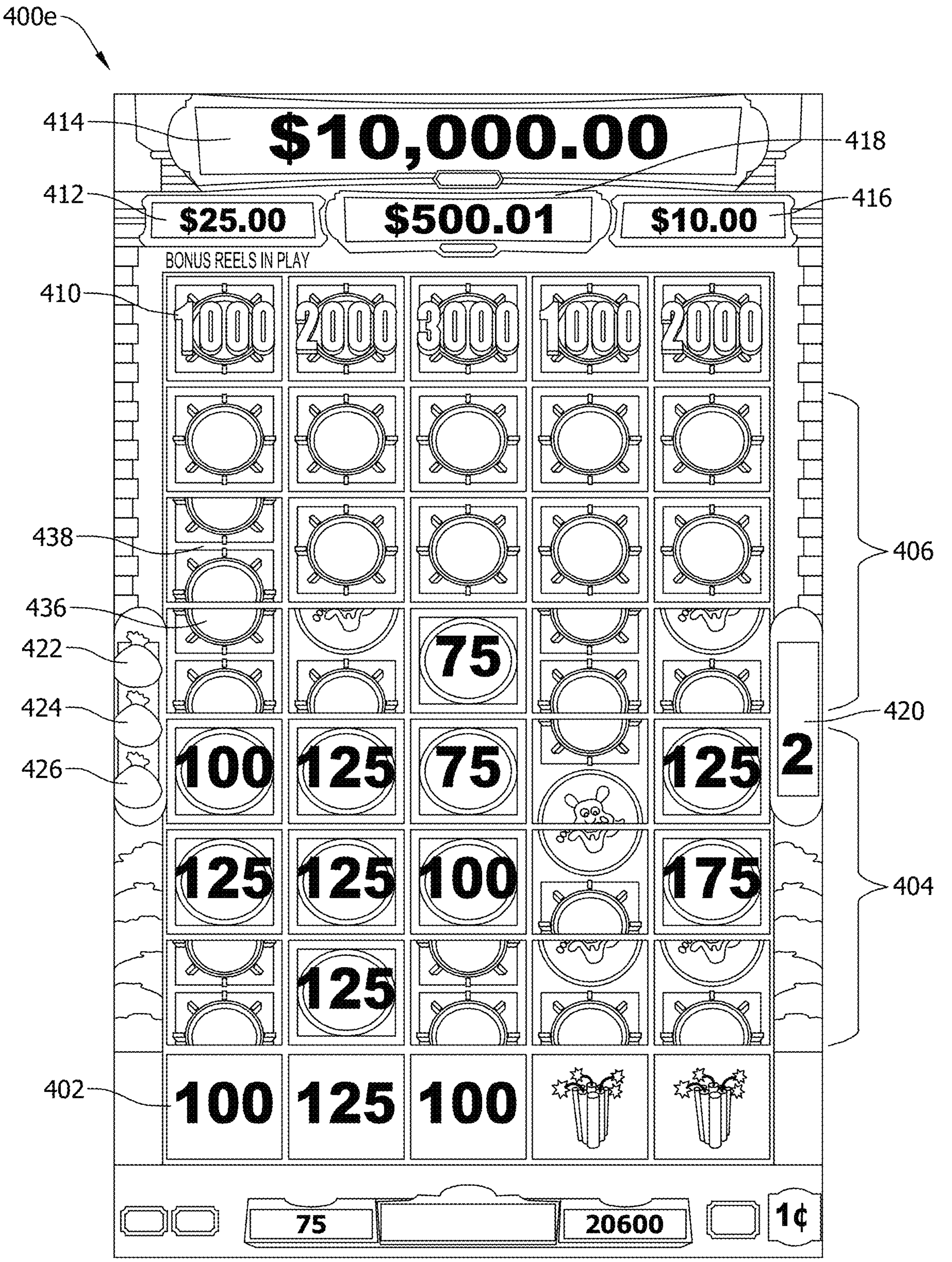

In an exemplary screenshot 400*e*, shown in FIG. 4E, during earlier spins, the player may have coin symbols in some game symbol positions which are showed with the respective credit values. Further, for the particular game instance shown in the screenshot 400*e*, the hold and spin feature may be enabled with extra rows feature and hence a row identified as 436 of the subset of locked or inactive rows 406 may be added as part of the subset of active rows for the particular game instance. Further, if the modifier row 402 has feature symbols such as dynamite symbols 432 and 434 for the particular game instance. As the spinning of the reels stops, and at least one coin symbol lands in the same column in which the dynamite symbol 432 in the modifier row 402 is displayed, a locked game symbol position from the subset of locked or inactive rows 406 in the column in which the coin symbol landed may be unlocked and added to the subset of active rows for the future spin.

Figure 4F:
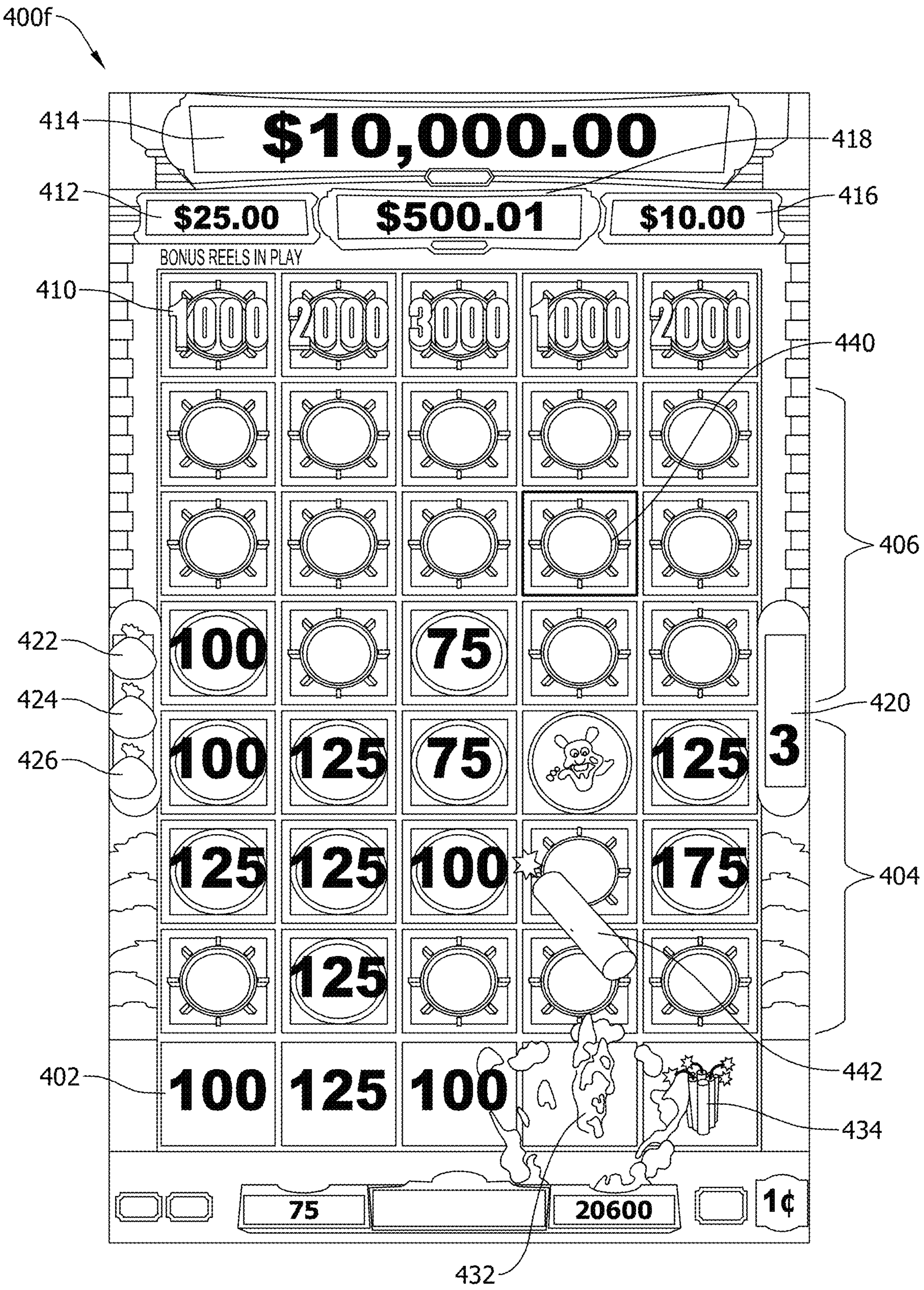

By way of an example, when the coin symbol lands in the same column in which the dynamite symbol 432 is displayed in an exemplary screenshot 400*f* in FIG. 4F, a locked game symbol position shown as 440 may be unlocked. No credit value may be awarded for the coin symbol landing in the same column in which a dynamite symbol is displayed in the modifier row 402. As described herein using this particular example, when there is no locked game symbol position to unlock, the player may be awarded a prize from the same column and shown in the row identified as 410. As described herein, the prize from the same column and shown in the row 410 may be awarded more than one time when the coin symbol lands in a game symbol position in a column in which a feature symbol such as a dynamite symbol is displayed in the modifier row 402. Additionally, or alternatively, an animation 442 showing a dynamite burst or sparkle may be displayed when the player is awarded the prize shown in the row 410.

If at the beginning of a spin, if a particular column (e.g., column 1) has all its game symbol position in either locked positions or has coin symbols that are locked from spinning during the subsequent spins, the column may be referenced as a disabled column. If a feature symbol such as a dynamite symbol appears in the modifier row 402 in the disabled column, the dynamite symbol may be displayed as visually distinguishable over other dynamite symbols, if any. Additionally, a locked position in the disabled column may be unlocked. By way of a non-limiting example, the locked position that is unlocked may be a locked position that is in the most bottom position in the disabled column. If all game symbol positions become unlocked, as described herein, the player may be awarded a prize displayed in the same column in the row 410 in which the dynamite symbol is displayed in the modifier row 402.

Figure 4G:
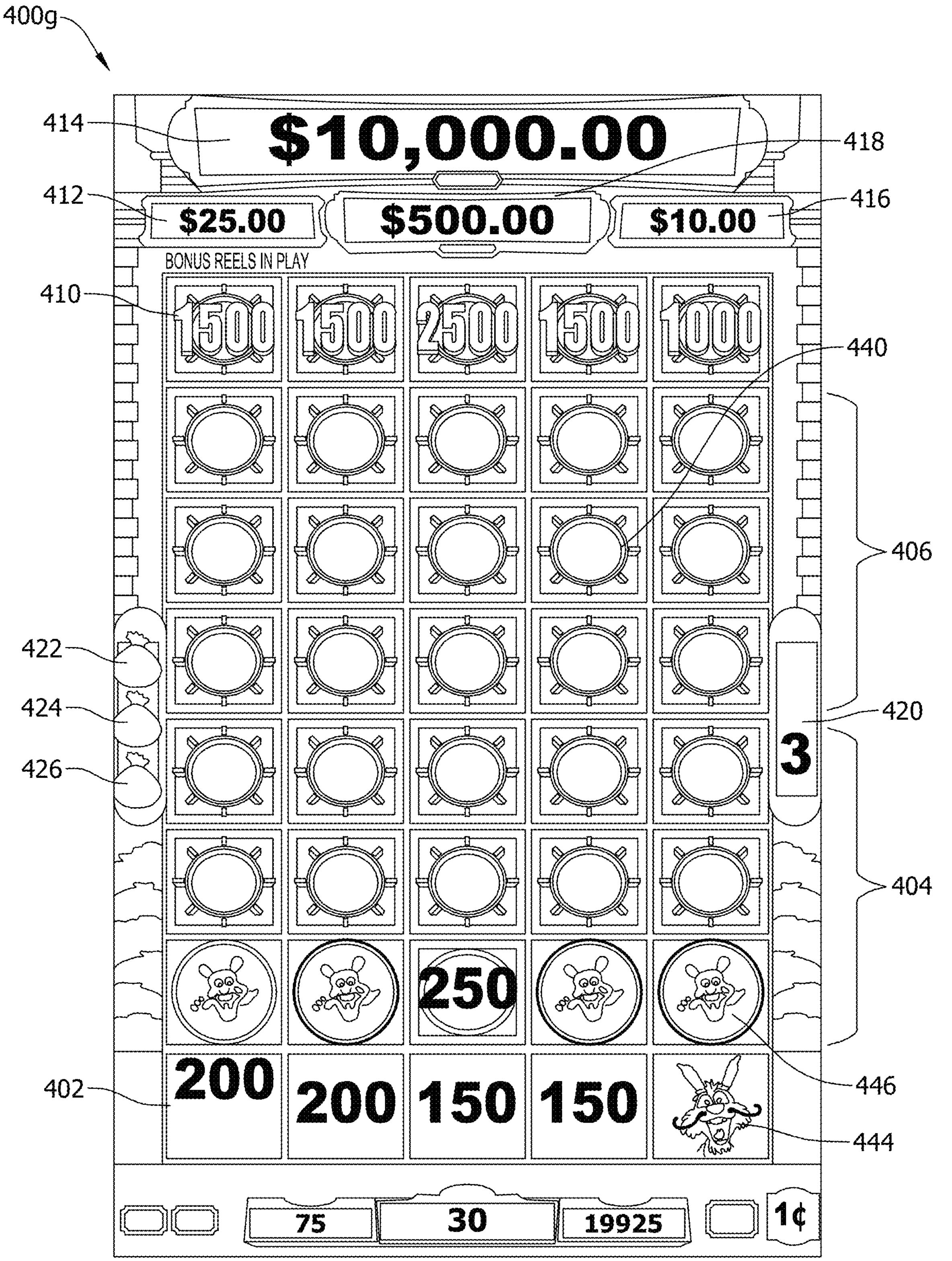
Figure 4H:
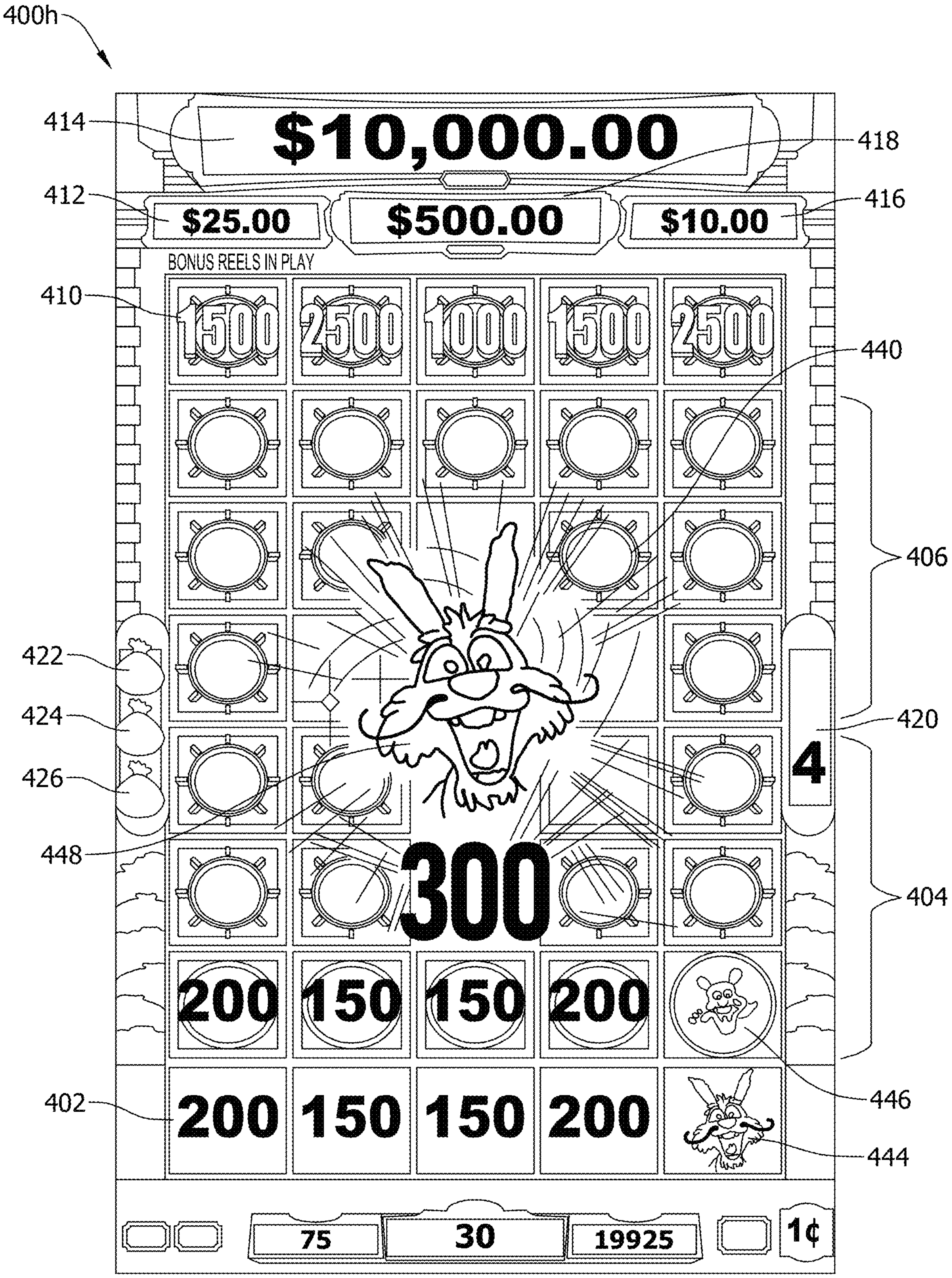

An exemplary screenshot 400*g* in FIG. 4G displays a feature symbol such as a Louie character symbol 444 in the modifier row 402, and a coin symbol 446 in the same column in which the Louie character symbol 444 is displayed. When the coin symbol 446 and the Louie character symbol 444 land in the same column, the player may be awarded a random prize value or one of Jackpot prizes 412, 414, 416, and/or 418. As shown in an exemplary screenshot 400*h* in FIG. 4H, an animation 448 may be displayed in which the Louie character may perform a headshake. Additionally, or alternatively, a prize value may be displayed, which may increase in predetermined steps until a final awarded prize value is reached and displayed.

Figure 4I:
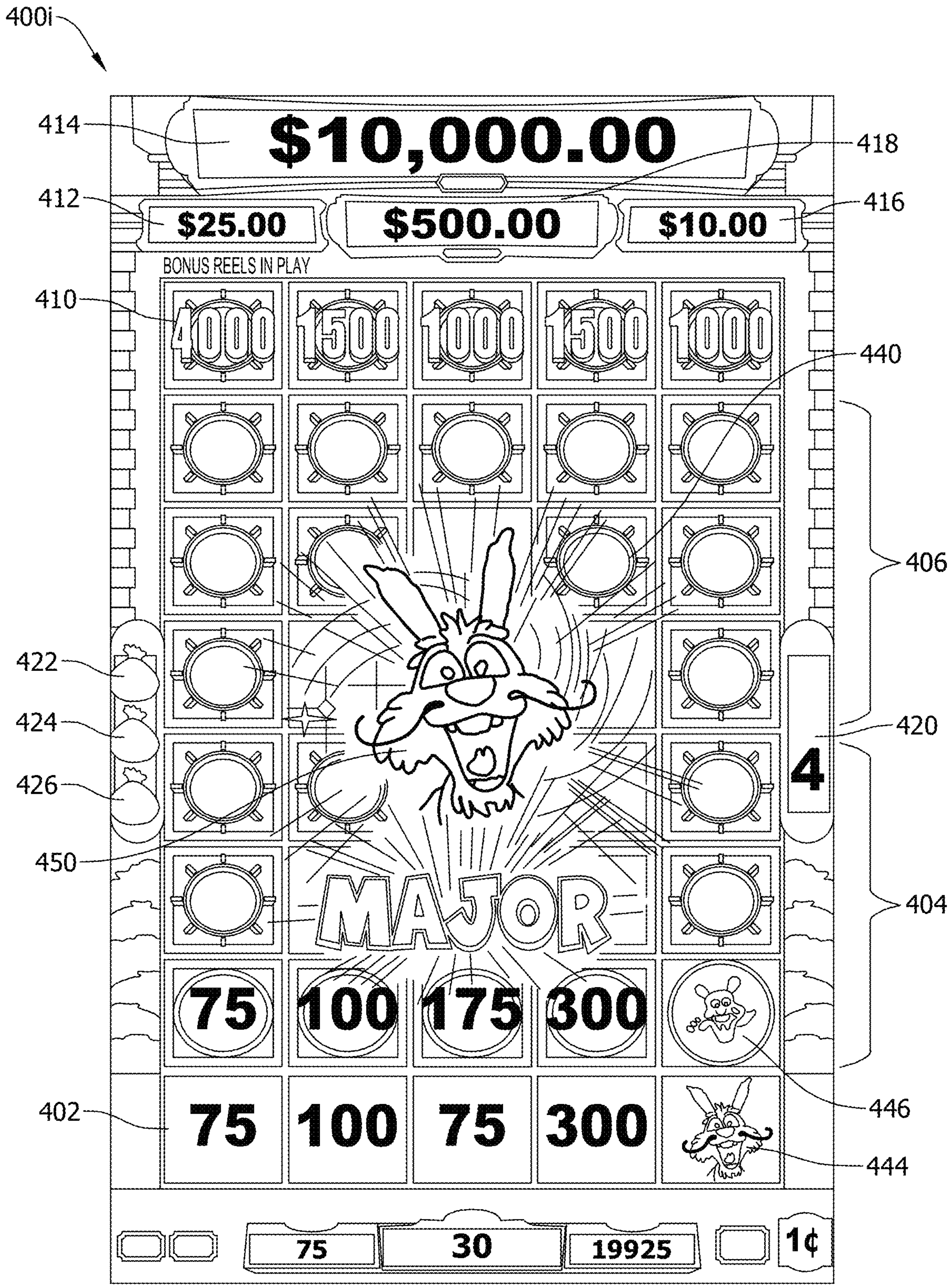

An exemplary screenshot 400*i* in FIG. 4I illustrates an animation 450 in which a Louie character performs a headshake. Along with the animation 450, a prize value, e.g., Major Jackpot, awarded to the player may also be displayed, which may increase in predetermined steps until a final awarded prize value is reached and displayed.

Figure 5:
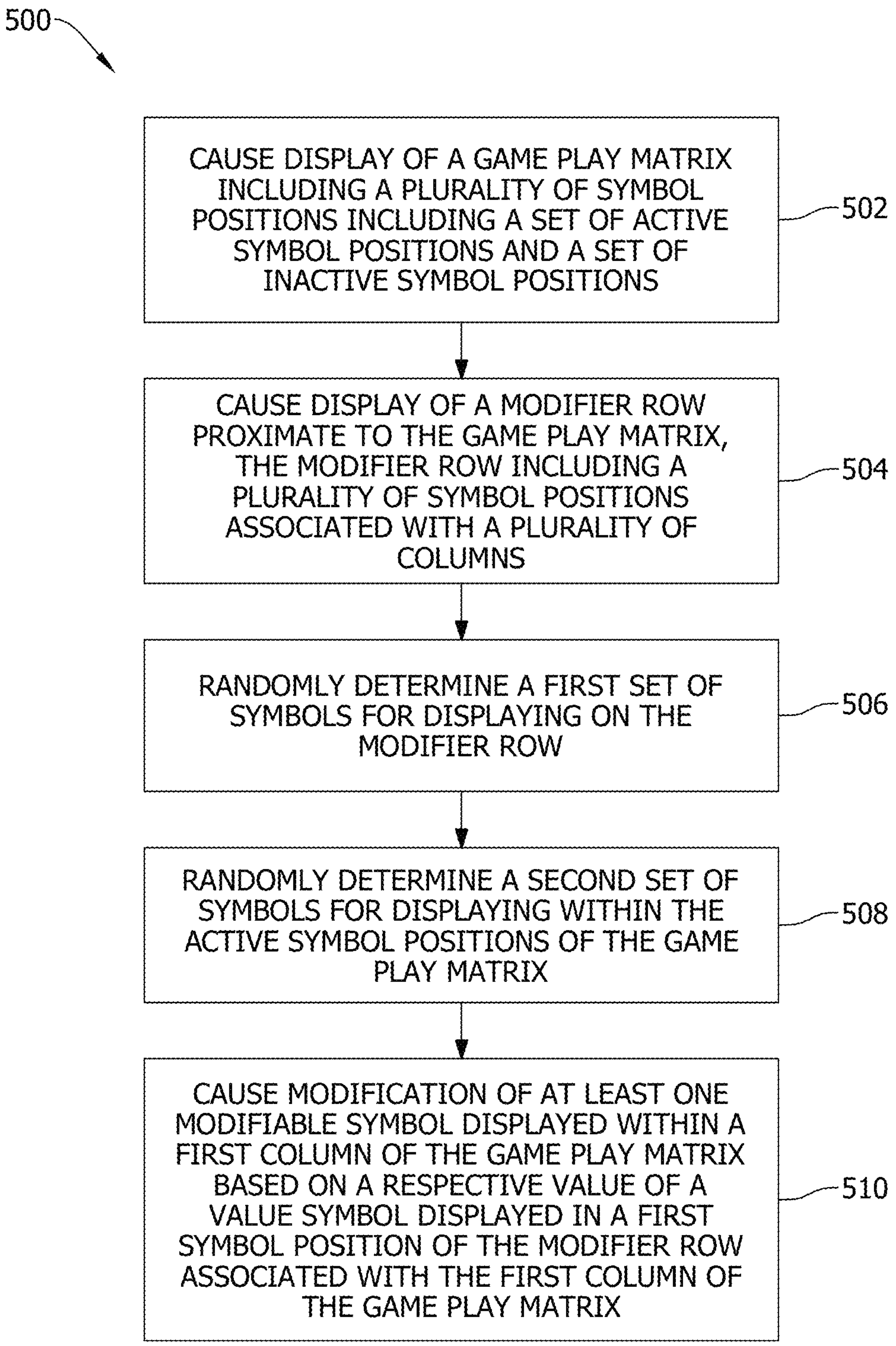
FIG. 5 illustrates an exemplary flow-chart of method operations performed by the EGM programmed to dynamically and randomly modify symbol awards displayed thereon.

FIG. 5 illustrates an exemplary flow-chart 500 of method operations performed by the EGM programmed to dynamically and randomly modify symbol awards displayed thereon. The method operations may be performed by an EGM (or an electronic gaming device). The EGM may include a display device. In some examples, the EGM may include an interface device coupling the EGM with an electronic gaming server. The EGM may also include a memory device that is configured to store instructions, which may be executed by a game controller of the EGM. The game controller may include a processor that is configured to execute the instructions stored in the memory device and/or instructions received from the electronic gaming server. One or more instructions received from the electronic gaming server and/or executed by the EGM may be generated using at least one RNG. By way of a non-limiting example, the EGM may be a user equipment such as a smartphone, a tablet, a laptop, a smart glass, and so on.

The EGM may receive an amount of bet wagered by a player on the EGM. The bet wagered by the player on the EGM may be cash, tokens, and/or credits, and so on. The bet may be wagered by the player in other forms as well. In response to the received amount of bet or wager, and in response to the user input to begin a base game play. During the base game play, a plurality of reels of the EGM displaying a plurality of randomly selected game symbols are spun and as the plurality of reels stops spinning, a feature game or a bonus game may be triggered if a specific condition to trigger the bonus game or the feature game is met.

In response to the bonus game or the feature game being triggered, a game play matrix including a plurality of symbol positions arranged in columns and rows may be displayed (502). The plurality of symbol positions may include a set of active symbol positions (e.g., in the subset of initial active rows 404) and a set of locked symbol positions (e.g., in the subset of locked or inactive rows 406). A modifier row proximate to the game play matrix may be displayed (504). As described herein, the modifier row may include a plurality of symbol positions (e.g., 5 symbol positions as shown here for the modifier row 402). Further, each symbol position of the modifier row may be associate with a column of the game play matrix as shown in FIGS. 4A-4I.

Using an output from an RNG, a first set of symbols for displaying in the plurality of symbol positions of the modifier row may be randomly determined (506). The first set of symbols may include a value symbol displayed in a first symbol position (or any other symbol position) of the plurality of symbol positions of the modifier row associated with a first column of the game play matrix (or a respective column of the game play matrix). The first set of symbols may further include at least one of (i) a Jackpot symbol; (ii) a first feature symbol; and/or (iii) a second feature symbol. By way of a non-limiting example, the first feature symbol may be a Louie character symbol and the second feature symbol may be a dynamite symbol.

Using an output from the RNG, a second set of symbols for displaying within the active symbol positions of the game play matrix may be determined (508). The second set of symbols may include including at least one modifiable symbol that is displayed within the first column of the game play matrix (or the respective column of the game play matrix). The second of symbols may further include a blank symbol. By way of a non-limiting example, the at least one modifiable symbol may be a coin symbol.

When the at least one modifiable symbol lands in the first column of the game play matrix (or the respective column of the game play matrix), the at least one modifiable symbol may be modified (510) by showing a respective value assigned to the value symbol displayed in the first symbol position of the modifier row associated with the first column of the game play matrix (or a respective game symbol position of the modifier row associated with the respective column of the game play matrix) as the being transferred to the at least one modifiable symbol displayed within the game play matrix.

In some embodiments, and by way of a non-limiting example, at least one feature may be enabled during the feature game or the bonus game. As described herein, the at least one feature that may be enabled during the bonus game or the feature game may include at least one of an extra rows hold and spin feature, an extra cash hold and spin feature, and/or an extra spins hold and spin feature. Additionally, or alternatively, the at least one feature to be enabled may be determined in accordance with the designated game volatility and/or RTP.

In accordance with the at least one feature enabled during the bonus game or the feature game being the extra rows hold and spin feature, the game play matrix may be displayed as including symbol positions from the set of locked symbol positions of at least one row of the rows from the subset of locked or inactive rows added to the set of active symbol positions. As described herein, the feature game play matrix area may be as shown in any of FIGS. 4A-4I and may include at least (i) a subset of modifier rows or a modifier row; (ii) a subset of (initially) active rows; and/or (iii) a subset of locked or inactive rows. The feature game play matrix area may be updated during the feature game or the bonus game, for example, by expanding the subset of active rows to add one or more rows from the subset of locked rows when the at least one feature enabled for the feature game includes the extra rows hold and spin feature.

A particular game symbols, for example, a blank symbol and a coin symbol, may be spun in one or more game symbol positions of the subset of active rows during the bonus game or the feature game. As described herein, in some cases, a game symbol position of the subset of active rows may become locked for a (subsequent) spin during the feature game when a coin symbol lands in a column in which one of: the credit value symbol, the Jackpot symbol, or the Louie character symbol, is displayed in the modifier row during a spin.

In one example, if the game symbol in the associated game symbol position in the modifier row is a credit value symbol, the award value may be a credit value corresponding to the credit value symbol. The award value may be displayed over the specific game symbol (e.g., the coin symbol). The award value may be displayed over the coin symbol as an overlay. In another example, if the game symbol in the associated game symbol position in the modifier row is a Louie character symbol, the displayed award value may be a randomly determined prize value or a Jackpot value. The prize value may be randomly determined based upon an output of an RNG. The Jackpot value may be corresponding to the Mini Jackpot, the Minor Jackpot, the Major Jackpot, and/or the Grand Jackpot. In yet another example, if the game symbol in the associated game symbol position in the modifier row is a dynamite symbol, the award value may be displayed as a game symbol position from the subset of locked rows being unlocked for a subsequent spin during the feature game.

A number of available spins may be reset to an initial value of free spins at a beginning of the feature game, when the game symbol (e.g., the coin symbol) lands in a game symbol position during the feature game. During the bonus game, a number of available spins may be set to an initial spin value of 3 free spins. However, the initial spin value may be set to a higher value (e.g., 4 free spins) when the at least one feature enabled for the feature game includes the extra spins hold and spin feature. The feature game or the bonus game may conclude when the number of available spins becomes 0, or all game symbol positions become locked game symbol positions.

Accordingly, various embodiments, as described herein, may provide an improvement over known EGMs such that during a game play, high prize (or award) values, feature enhancements, and/or feature triggers may be enabled or displayed without impacting the game feature's volatility. The improvement over known EGMs may be realized by using the modifier row to include prize values regardless of whether an activation symbol (or a trigger symbol or a credit symbol) lands in a game symbol position in the game play matrix area. Further, even though the prize values are revealed in the modifier row, payout may occur only if the activation symbol (or the trigger symbol or the credit symbol) lands in a game symbol position in the game play matrix area.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device, comprising:

a memory device storing instructions; and a game controller comprising a processor configured to execute the instructions stored in the memory device, which, when executed, cause the game controller to:

in response to triggering a bonus game, cause display of a game play matrix including a plurality of symbol positions arranged in columns and rows, the plurality of symbol positions including a set of active symbol positions and a set of locked symbol positions;

cause display of a modifier row proximate to the game play matrix, the modifier row including a plurality of symbol positions, each symbol position of the modifier row being associated with a column of the game play matrix;

randomly determine, using an output from a random number generator (RNG), a first set of symbols for displaying on the modifier row, the first set of symbols including a value symbol displayed in a first symbol position of the modifier row associated with a first column of the game play matrix;

randomly determine, using another output from the RNG, a second set of symbols for displaying within the active symbol positions of the game play matrix, the second set of symbols including at least one modifiable symbol displayed within the first column of the game play matrix; and cause modification of the at least one modifiable symbol by showing a respective value assigned to the value symbol displayed in the first symbol position of the modifier row associated with the first column of the game play matrix being transferred to the at least one modifiable symbol displayed within the game play matrix.

2. The electronic gaming device of claim 1, wherein the first set of symbols further includes at least one of: a Jackpot symbol, a first feature symbol, or a second feature symbol.

3. The electronic gaming device of claim 1, wherein the second set of symbols further includes a blank symbol, and wherein the at least one modifiable symbol is a coin symbol.

4. The electronic gaming device of claim 1, wherein the instructions further cause the game controller to enable at least one feature during the feature game, and wherein the at least one feature includes an extra rows hold and spin feature, an extra cash hold and spin feature, or an extra spins hold and spin feature.

5. The electronic gaming device of claim 4, wherein the instructions further cause the game controller to cause display of the game play matrix including symbol positions from the set of locked symbol positions of at least one row of the rows added to the set of active symbol positions when the at least one feature enabled during the feature game includes the extra rows hold and spin feature.

6. The electronic gaming device of claim 1, wherein the instructions further cause the game controller to set a higher value for an initial value of free spins when the at least one feature enabled during the feature game includes extra spins hold and spin feature in comparison with a value set for the initial value of free spins when the extra spins hold and spin feature is disabled during the feature game.

7. The electronic gaming device of claim 1, wherein:

the at least one modifiable symbol is a coin symbol;

the value symbol displayed in the first game symbol position of the modifier row associated with the first column is a credit value symbol; and the modification of the at least one modifiable symbol includes overlaying of a credit value corresponding to the credit value symbol.

8. The electronic gaming device of claim 1, wherein:

the at least one modifiable symbol is a coin symbol;

the value symbol displayed in the first game symbol position of the modifier row associated with the first column is a feature symbol; and the modification of the at least one modifiable symbol includes overlaying of a randomly determined prize value of a Jackpot value.

9. The electronic gaming device of claim 8, wherein the feature symbol is a Louie character symbol, and wherein the instructions further cause the game controller to display an animation of the Louie character symbol to perform head-shake.

10. The electronic gaming device of claim 1, wherein:

the at least one modifiable symbol is a coin symbol;

the value symbol displayed in the first game symbol position of the modifier row associated with the first column is a feature symbol that is a dynamite symbol;

the modification of the at least one modifiable symbol includes no modification to the at least one modifiable symbol; and the instructions further cause the game controller to unlock a symbol position from the set of locked symbol positions for a subsequent spin during the feature game.

11. The electronic gaming device of claim 1, wherein the instructions further cause the game controller to lock the game symbol position of the one or more game symbol positions for a subsequent spin during the feature game when the game symbol in the associated game symbol position in the modifier row includes one of a credit value symbol, a Jackpot symbol, or a feature symbol.

12. A computer-implemented method, comprising:

in response to triggering a bonus game, causing display of a game play matrix including a plurality of symbol positions arranged in columns and rows, the plurality of symbol positions including a set of active symbol positions and a set of locked symbol positions;

causing display of a modifier row proximate to the game play matrix, the modifier row including a plurality of symbol positions, each symbol position of the modifier row being associated with a column of the game play matrix;

randomly determining, using an output from a random number generator (RNG), a first set of symbols for displaying on the modifier row, the first set of symbols including a value symbol displayed in a first symbol position of the modifier row associated with a first column of the game play matrix;

randomly determining, using another output from the RNG, a second set of symbols for displaying within the active symbol positions of the game play matrix, the second set of symbols including at least one modifiable symbol displayed within the first column of the game play matrix; and causing modification of the at least one modifiable symbol by showing a respective value assigned to the value symbol displayed in the first symbol position of the modifier row associated with the first column of the game play matrix being transferred to the at least one modifiable symbol displayed within the game play matrix.

13. The computer-implemented method of claim 12, wherein:

the first set of symbols further includes at least one of: a Jackpot symbol, a first feature symbol or a second feature symbol;

the second set of symbols further includes a blank symbol, and the at least one modifiable symbol is a coin symbol; and the method further comprising enabling at least one feature during the feature game, the at least one feature including an extra rows hold and spin feature, an extra cash hold and spin feature, or an extra spins hold and spin feature.

14. The computer-implemented method of claim 13, further comprising causing display of the game play matrix including symbol positions from the set of locked symbol positions of at least one row of the rows added to the set of active symbol positions when the at least one feature enabled during the feature game includes extra rows hold and spin feature.

15. The computer-implemented method of claim 12, wherein:

the at least one modifiable symbol is a coin symbol;

the value symbol displayed in the first game symbol position of the modifier row associated with the first column is a credit value symbol; and the modification of the at least one modifiable symbol includes overlaying of a credit value corresponding to the credit value symbol.

16. The computer-implemented method of claim 12, wherein:

the at least one modifiable symbol is a coin symbol;

the value symbol displayed in the first game symbol position of the modifier row associated with the first column is a feature symbol; and the modification of the at least one modifiable symbol includes overlaying of a randomly determined prize value of a Jackpot value.

17. The computer-implemented method of claim 16, wherein the feature symbol is a Louie character symbol, and wherein the method further comprising displaying an animation of the Louie character symbol to perform headshake or coin shower.

18. The computer-implemented method of claim 12, wherein:

the at least one modifiable symbol is a coin symbol;

the value symbol displayed in the first game symbol position of the modifier row associated with the first column is a feature symbol that is a dynamite symbol;

the modification of the at least one modifiable symbol includes no modification to the at least one modifiable symbol; and the method further comprising unlocking a symbol position from the set of locked symbol positions for a subsequent spin during the feature game.

19. The computer-implemented method of claim 12, further comprising locking the game symbol position of the one or more game symbol positions for a subsequent spin during the feature game when the game symbol in the associated game symbol position in the modifier row includes one of a credit value symbol, a Jackpot symbol, or a feature symbol that is a Louie character symbol.

20. An electronic gaming application server communicatively coupled with an electronic gaming device, the electronic gaming application server comprising:

a memory device storing instructions;

at least one random number generator (RNG); and a game controller comprising a processor configured to execute the instructions stored in the memory device, which, when executed, cause the game controller to:

in response to triggering a bonus game, cause display of a game play matrix including a plurality of symbol positions arranged in columns and rows, the plurality of symbol positions including a set of active symbol positions and a set of locked symbol positions;

cause display of a modifier row proximate to the game play matrix, the modifier row including a plurality of symbol positions, each symbol position of the modifier row being associated with a column of the game play matrix;

randomly determine, using an output from a random number generator (RNG), a first set of symbols for displaying on the modifier row, the first set of symbols including a value symbol displayed in a first symbol position of the modifier row associated with a first column of the game play matrix;

randomly determine, using another output from the RNG, a second set of symbols for displaying within the active symbol positions of the game play matrix, the second set of symbols including at least one modifiable symbol displayed within the first column of the game play matrix; and cause modification of the at least one modifiable symbol by showing a respective value assigned to the value symbol displayed in the first symbol position of the modifier row associated with the first column of the game play matrix being transferred to the at least one modifiable symbol displayed within the game play matrix.

* * * * *